(12) United States Patent
Ahn et al.

(10) Patent No.: US 11,737,152 B2
(45) Date of Patent: *Aug. 22, 2023

(54) WIRELESS COMMUNICATION METHOD USING TXOP AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Geonjung Ko, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,490

(22) Filed: Mar. 22, 2022

(65) Prior Publication Data
US 2022/0217791 A1    Jul. 7, 2022

Related U.S. Application Data

(63) Continuation of application No. 16/844,792, filed on Apr. 9, 2020, now Pat. No. 11,343,859, which is a
(Continued)

(30) Foreign Application Priority Data

Jan. 9, 2017  (KR) .................. 10-2017-0003137
Jan. 17, 2017  (KR) .................. 10-2017-0008306
(Continued)

(51) Int. Cl.
*H04W 74/00*   (2009.01)
*H04W 74/08*   (2009.01)
(Continued)

(52) U.S. Cl.
CPC ...... *H04W 74/0866* (2013.01); *H04B 7/0417* (2013.01); *H04B 7/0617* (2013.01); *H04B 7/0632* (2013.01); *H04W 84/12* (2013.01)

(58) Field of Classification Search
None
See application file for complete search history.

(56) References Cited

U.S. PATENT DOCUMENTS 7,738,441 B2 *  6/2010  Nishibayashi ........ H04L 1/1829
                                                                370/469
7,848,330 B2   12/2010  Nishibayashi et al.
(Continued)

FOREIGN PATENT DOCUMENTS

CN    102882660    1/2013
EP    2 717 522    4/2014
(Continued)

OTHER PUBLICATIONS

International Search Report for PCT/KR2018/000447 dated May 31, 2018 and its English translation from WIPO (now published as WO 2018/128532).
(Continued)

*Primary Examiner* — Gerald A Smarth
(74) *Attorney, Agent, or Firm* — Ladas & Parry, LLP

(57) ABSTRACT

Provided is a wireless communication terminal that wirelessly communicates. the wireless communication terminal includes: a transceiver for transmitting and receiving a wireless signal; and a processor for processing the wireless signal. The processor is configured to perform a transmission based on a transmission opportunity (TXOP) limit
(Continued)

which is a maximum value of a TXOP, which is a time interval in which a wireless communication terminal has a right to initiate a frame exchange sequence in a wireless medium.

6 Claims, 17 Drawing Sheets

Related U.S. Application Data continuation of application No. 16/503,486, filed on Jul. 4, 2019, now Pat. No. 10,660,139, which is a continuation of application No. PCT/KR2018/000447, filed on Jan. 9, 2018.

(30) Foreign Application Priority Data

| | | |
|---|---|---|
| Feb. 23, 2017 | (KR) | 10-2017-0024265 |
| May 5, 2017 | (KR) | 10-2017-0057098 |

(51) Int. Cl.
  *H04B 7/0417* (2017.01)
  *H04B 7/06* (2006.01)
  *H04W 84/12* (2009.01)

(56) References Cited

U.S. PATENT DOCUMENTS

| | | | |
|---|---|---|---|
| 8,274,992 | B2 | 9/2012 | Nishibayashi et al. |
| 8,842,657 | B2 | 9/2014 | Walton et al. |
| 10,917,220 | B2 | 2/2021 | Seok |
| 2002/0107955 | A1 | 8/2002 | Rawson, III |
| 2002/0107984 | A1 | 8/2002 | Rawson, III |
| 2005/0238054 | A1 | 10/2005 | Sharma |
| 2006/0048034 | A1 | 3/2006 | Cho |
| 2008/0056297 | A1 | 3/2008 | Gaur et al. |
| 2011/0085508 | A1 | 4/2011 | Wengerter et al. |
| 2012/0263126 | A1* | 10/2012 | Choi ............. H04B 7/0617 370/329 |
| 2012/0314719 | A1 | 12/2012 | Agiwal et al. |
| 2014/0146751 | A1 | 5/2014 | Jiang et al. |
| 2014/0376535 | A1 | 12/2014 | Murakami et al. |
| 2015/0055577 | A1 | 2/2015 | Han et al. |
| 2015/0172996 | A1 | 6/2015 | Park et al. |
| 2016/0100396 | A1* | 4/2016 | Seok ............. H04L 5/003 370/329 |
| 2016/0182205 | A1 | 6/2016 | Asterjadhi et al. |
| 2016/0315675 | A1 | 10/2016 | Seok |
| 2016/0323424 | A1 | 11/2016 | Merlin et al. |
| 2016/0330714 | A1 | 11/2016 | Hedayat |
| 2017/0048048 | A1 | 2/2017 | Seok |
| 2017/0149536 | A1 | 5/2017 | Chu et al. |
| 2017/0150493 | A1 | 5/2017 | Seok |
| 2017/0289843 | A1 | 10/2017 | Kim et al. |
| 2018/0138959 | A1 | 5/2018 | Chun et al. |
| 2019/0327771 | A1 | 10/2019 | Ahn et al. |
| 2020/0236721 | A1 | 7/2020 | Ahn et al. |

FOREIGN PATENT DOCUMENTS

| | | |
|---|---|---|
| JP | 2002-135231 | 5/2002 |
| JP | 2014-523198 | 9/2014 |
| JP | 2016-167608 | 9/2016 |
| KR | 10-2006-0090259 | 8/2006 |
| KR | 10-2017-0002491 | 1/2017 |
| WO | 2005/039133 | 4/2005 |
| WO | 2013/191447 | 12/2013 |
| WO | 2015/034166 | 3/2015 |
| WO | 2015/102228 | 7/2015 |
| WO | 2016/024750 | 2/2016 |
| WO | 2016/105515 | 6/2016 |
| WO | 2016/167608 | 10/2016 |
| WO | 2018/128532 | 7/2018 |

OTHER PUBLICATIONS

Written Opinion of the International Searching Authority for PCT/KR2018/000447 dated May 31, 2018 and its English translation from WIPO (now published as WO 2018/128532).

International Preliminary Report on Patentability (Chapter I) dated Oct. 2, 2018 for PCT/KR2018/000447 and its English translation from WIPO (now published as WO 2018/128532).

Woojin Ahn et al., "Wireless LANs", IEEE P802.11, CR on 10.22.2.8 TXOP limits doc.: IEEE 802.11-17/0088r0, Jan. 17, 2017, 2017, pp. 1-3.

Woojin Ahn et al., WILUS: "Wireless LANs", IEEE P802.11 CR on 10.22.2.8 TXOP limits; doc.: IEEE 802.11-17/0088r1; Mar. 9, 2017, pp. 1-5.

Woojin Ahn et al., WILUS: "Wireless LANs", IEEE P802.11 CR on 10.22.2.8 TXOP limits; doc.: IEEE 802.11-17/0088r3; May 10, 2017, pp. 1-5.

Notice of Allowance dated Jan. 10, 2020 for U.S. Appl. No. 16/503,486 (now published as US 2019/0327771).

Non-Final Office Action dated Sep. 6, 2019 for U.S. Appl. No. 16/503,486 (now published as US 2019/0327771).

Office Action dated Jun. 8, 2020 for Japanese Patent Application No. 2019-537067 and its English translation provided by Applicant's foreign counsel.

Notice of Allowance dated Aug. 3, 2020 for Korean Patent Application No. 10-2019-7019257 and its English translation provided by Applicant's foreign counsel.

Extended European Search Report dated Jul. 20, 2020 for European Patent Application No. 18736031.8.

Matthew Fischer (Broadcom Limited), "A-MSDU Fragmentation", IEEE 802.11-16/1409r2, IEEE, Internet URL: https://mentor.ieee.org/802.11/dcn/16/11-16-1409-02-00ax-a-msdu-fragmentation.docx, Nov. 8, 2016

Office Action dated Feb. 22, 2021 for Japanese Patent Application No. 2019-537067 and its English translation from Global Dossier.

Office Action dated May 12, 2021 for Korean Patent Application No. 10-2021-7009390 and its English translation provided by Applicant's foreign counsel.

Office Action dated Jun. 10, 2021 for U.S. Appl. No. 16/844,804.

Notice of Allowance dated Dec. 1, 2021 for U.S. Appl. No. 16/844,804.

Extended European Search Report dated Feb. 10, 2022 for European Patent Application No. 21205561.0.

Notice of Allowance dated Jan. 24, 2022 for U.S. Appl. No. 16/844,792 (now published as US 2020/0236721).

Office Action dated Jun. 24, 2021 for U.S. Appl. No. 16/844,792 (now published as US 2020/0236721).

Office Action dated Mar. 26, 2020 for Korean Patent Application No. 10-2019-7019257 and its English translation provided by Applicant's foreign counsel.

Notice of Allowance dated Jun. 11, 2021 for European Patent Application No. 18 736 031.8.

Notice of Allowance dated Mar. 4, 2022 for Korean Patent Application No. 10-2021-7009390 and its English translation provided by Applicant's foreign counsel.

Office Action dated May 25, 2022 for Indian Patent Application No. 202128038546.

Office Action dated Jul. 4, 2022 for Japanese Patent Application No. 2021-112808 and its English translation provided by Applicant's foreign counsel.

Office Action dated Jul. 4, 2022 for Japanese Patent Application No. 2021-112807 and its English translation provided by Applicant's foreign counsel.

Office Action dated Jul. 15, 2022 for Korean Patent Application No. 10-2022-7018689 and its English translation provided by Applicant's foreign counsel.

Notice of Allowance dated Oct. 11, 2022 for Japanese Patent Application No. 2021-112808 and its English translation provided by Applicant's foreign counsel.

Notice of Allowance dated Oct. 11, 2022 for Japanese Patent Application No. 2021-112807 and its English translation provided by Applicant's foreign counsel.

(56) References Cited

OTHER PUBLICATIONS

Office Action dated Sep. 27, 2022 for Chinese Patent Application No. 201880006167.5 and its English translation provided by Applicant's foreign counsel.

* cited by examiner

WIRELESS COMMUNICATION METHOD USING TXOP AND WIRELESS COMMUNICATION TERMINAL USING SAME

CROSS-REFERENCE TO RELATED APPLICATIONS

This application is a continuation of U.S. patent application Ser. No. 16/844,792 filed on Apr. 9, 2020, which is a continuation of U.S. patent application Ser. No. 16/503,486 filed on Jul. 4, 2019, now issued as U.S. Pat. No. 10,660,139 dated May 19, 2020, which is a continuation of International Patent Application No. PCT/KR2018/000447 filed on Jan. 9, 2018, which claims the priority to Korean Patent Application No. 10-2017-0003137 filed in the Korean Intellectual Property Office on Jan. 9, 2017, Korean Patent Application No. 10-2017-0008306 filed in the Korean Intellectual Property Office on Jan. 17, 2017, Korean Patent Application No. 10-2017-0024265 filed in the Korean Intellectual Property Office on Feb. 23, 2017, and Korean Patent Application No. 10-2017-0057098 filed in the Korean Intellectual Property Office on May 5, 2017, the entire contents of which are incorporated herein by reference.

TECHNICAL FIELD

The present invention relates to a wireless communication method and a wireless communication terminal using TXOP.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using TXOP.

Technical Solution

According to an embodiment of the present invention, a wireless communication terminal that wirelessly communicates includes: a transceiver for transmitting and receiving a wireless signal; and a processor for processing the wireless signal. The processor is configured to perform a transmission based on a transmission opportunity (TXOP) limit which is a maximum value of a TXOP, which is a time interval in which a wireless communication terminal has a right to initiate a frame exchange sequence in a wireless medium.

The processor may be configured to transmit a Beamforming Report Poll (BRP) trigger frame to another wireless communication terminal using a TXOP exceeding a TXOP limit, and receive a feedback frame in response to the BRP trigger frame from the another wireless communication terminal within the TXOP exceeding the TXOP limit. In this case, the BRP trigger frame may trigger simultaneous transmission of feedback frames of one or more wireless communication terminals. In addition, the feedback frame may indicate a state of a channel measured by the another wireless communication terminal, which is to be used for a Multi Input Multi Output (MIMO) transmission to the another wireless communication terminal of the wireless communication terminal or is to be used for a beamforming transmission to the another wireless communication terminal of the wireless communication terminal.

After a predetermined time from when the wireless communication terminal transmits a Null Data Packet Announcement (NDPA) frame informing the another wireless communication terminal that a sounding protocol sequence is initiated, the processor may be configured to transmit a Null Data Packet (NDP) frame to be used for a state measurement of the channel to the another wireless communication terminal. In this case, when the wireless communication terminal transmits the NDPA frame, the NDP frame, and the BRP trigger frame within the TXOP limit, the processor may be configured to transmit the BRP trigger frame to the another wireless communication terminal using the TXOP exceeding the TXOP limit after a predetermined time from when the wireless communication terminal transmits the NDP frame to the another wireless communication terminal.

When the wireless communication terminal transmits the BRP trigger frame within the TXOP limit, the processor may be configured to transmit the BRP trigger frame using the TXOP exceeding the TXOP limit.

The feedback frame may be transmitted from the another wireless communication terminal after a predetermined time from when the another wireless communication terminal receives the BRP trigger frame.

The processor may be configured to use dynamic fragmentation to generate at least one fragment, and transmit the at least one fragment to another wireless communication terminal. In this case, the dynamic fragmentation represents a fragment that is not a static fragmentation that is required to equally fragment the size of all fragments except the last fragment.

The processor may be configured to foremost generate a first fragment of the at least one fragment based on a value that the another wireless communication terminal designates as a minimum size of a fragment, and transmit the first fragment to the another wireless communication terminal using the TXOP exceeding the TXOP limit.

When the wireless communication terminal transmits the at least one fragment to the another wireless communication terminal without using an Aggregate (A)-MPDU including a plurality of MAC Protocol Data Units (MPDUs), the processor may be configured to transmit the first fragment to the another wireless communication terminal using the TXOP exceeding the TXOP limit.

The processor may be configured to generate the first fragment with a size equal to a value that the another wireless communication terminal designates as a minimum size of a fragment.

The processor may be configured to generate the at least one fragment by the maximum number of fragments that the wireless communication terminal is capable of generating, and transmit a first fragment generated last among the at least one fragment to the another wireless communication terminal using the TXOP exceeding the TXOP limit.

The maximum number of fragments that the wireless communication terminal is capable of generating may be 16.

When the another wireless communication terminal explicitly fails to receive a first fragment, which is one of the at least one fragment, based on at least one of whether the wireless communication terminal does not transmit a fragment following the first fragment and whether the another wireless communication terminal explicitly fails to receive a fragment following the first fragment, the processor may be configured to generate a fourth fragment having a size different from the third fragment and having a sequence number and a fragment number that are the same as a sequence number and a fragment number of the third fragment. In this case, the processor may be configured to transmit the fourth fragment to the another wireless communication terminal instead of retransmitting the third fragment to the another wireless communication terminal.

When there is no BlockACK agreement between the wireless communication terminal and the another wireless communication terminal, the processor may be configured to perform dynamic fragmentation according to a fragmentation level determined according to the capability of the another wireless communication terminal. In this case, the fragmentation level may indicate a transmission method of a fragment.

The wireless communication terminal may be a TXOP holder.

According to an embodiment of the present invention, an operation method of a wireless communication terminal that wirelessly communicates includes: performing a transmission based on a transmission opportunity (TXOP) limit which is a maximum value of a TXOP, which is a time interval in which a wireless communication terminal has a right to initiate a frame exchange sequence in a wireless medium.

The performing the transmission based on the TXOP limit may include: transmitting a Beamforming Report Poll (BRP) trigger frame to another wireless communication terminal using a TXOP exceeding a TXOP limit, and receiving a feedback frame in response to the BRP trigger frame from the another wireless communication terminal within the TXOP exceeding the TXOP limit. In this case, the BRP trigger frame may trigger simultaneous transmission of feedback frames of one or more wireless communication terminals. In this case, the feedback frame may indicate a state of a channel measured by the another wireless communication terminal, which is to be used for a Multi Input Multi Output (MIMO) transmission to the another wireless communication terminal of the wireless communication terminal or is to be used for a beamforming transmission to the another wireless communication terminal of the wireless communication terminal.

The transmitting the BRP trigger frame may include: after a predetermined time from when the wireless communication terminal transmits a Null Data Packet Announcement (NDPA) frame informing the another wireless communication terminal that a sounding protocol sequence is initiated, receiving, by the another wireless communication, a Null Data Packet (NDP) frame to be used for the channel state measurement, and when the wireless communication terminal transmits the NDPA frame, the NDP frame, and the BRP trigger frame within the TXOP limit, transmitting the BRP trigger frame using the TXOP exceeding the TXOP limit after a predetermined time from when the wireless communication terminal transmits the NDP frame to the another wireless communication terminal.

The transmitting the BRP trigger frame using the TXOP exceeding the TXOP limit may include when transmitting the BRP trigger frame within the TXOP limit, transmitting the BRP trigger frame using the TXOP exceeding the TXOP limit.

The method may further include using dynamic fragmentation to generate at least one fragment, wherein the performing of the transmission based on the TXOP limit may include transmitting the at least one fragment to another wireless communication terminal. In this case, the dynamic fragmentation may represent a fragment that is not a static fragmentation that is required to equally fragment the size of all fragments except the last fragment.

The generating the at least one fragment may include foremost generating a first fragment of the at least one fragment based on a value that the another wireless communication terminal designates as a minimum size of a fragment, the transmitting the at least one fragment to the another wireless communication terminal may include transmitting the first fragment to the another wireless communication terminal using the TXOP exceeding the TXOP limit.

The foremost generating of the first fragment among the at least one fragment may include generating the first fragment with a size equal to a value that the another wireless communication terminal designates as a minimum size of a fragment.

The generating the at least one fragment includes generating the at least one fragment by a maximum number of fragments that the wireless communication terminal is capable of generating, and the transmitting of the at least one fragment to another wireless communication terminal includes transmitting a second fragment, which is last generated among the at least one fragment, to the another wireless communication terminal using the TXOP exceeding the TXOP limit.

The operating method may include, when the another wireless communication terminal explicitly fails to receive a third fragment, which is one of the at least one fragment, generating a fourth fragment having a size different from a size of the third fragment for retransmission, and having a sequence number and fragment number which are same as a sequence number and fragment number of the third fragment for retransmission of the third fragment based on at least one of whether the wireless communication terminal transmits a fragment following the third fragment or whether the another wireless communication terminal explicitly fails to receive a fragment following the third fragment; and transmitting the fourth fragment to the another wireless communication terminal instead of retransmitting the third fragment to the another wireless communication terminal.

Advantageous Effects

An embodiment of the present invention provides a wireless communication method using TXOP and a wireless communication terminal using the same.

MODE FOR CARRYING OUT THE INVENTION

Figure 1:
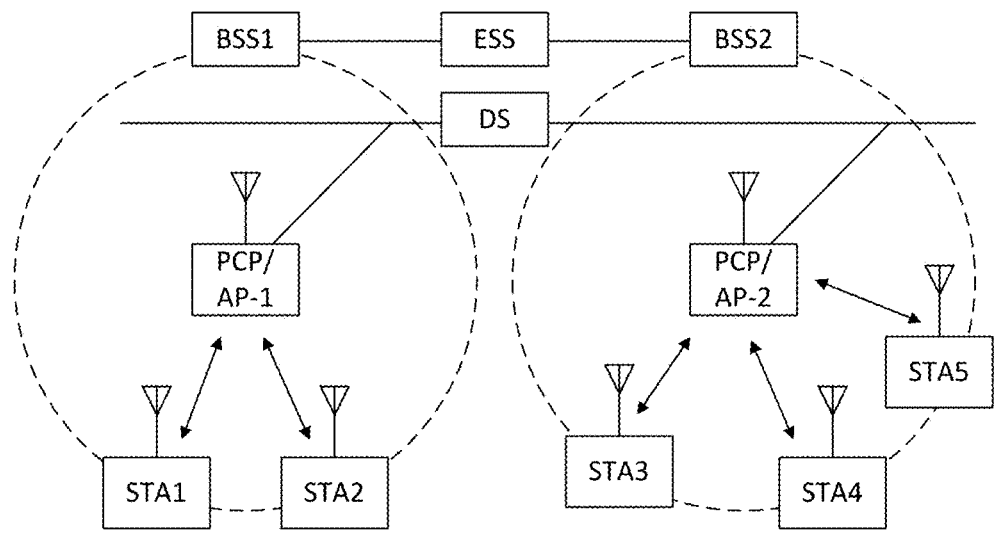
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2017-0003137 (2017 Jan. 9), Nos. 10-2017-0008306 (2017 Jan. 17), Nos. 10-2017-0024265 (2017 Feb. 23), and Nos. 10-2017-0057098 (2017 May 5) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
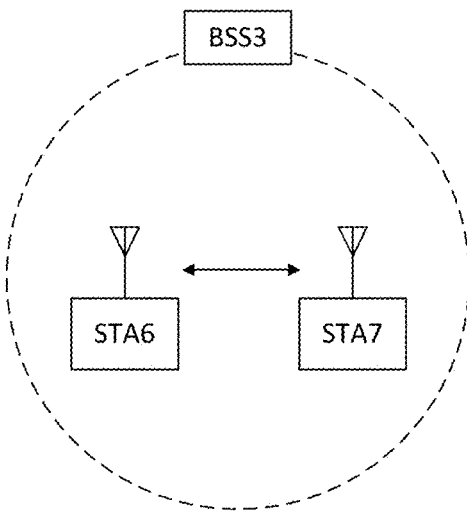
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
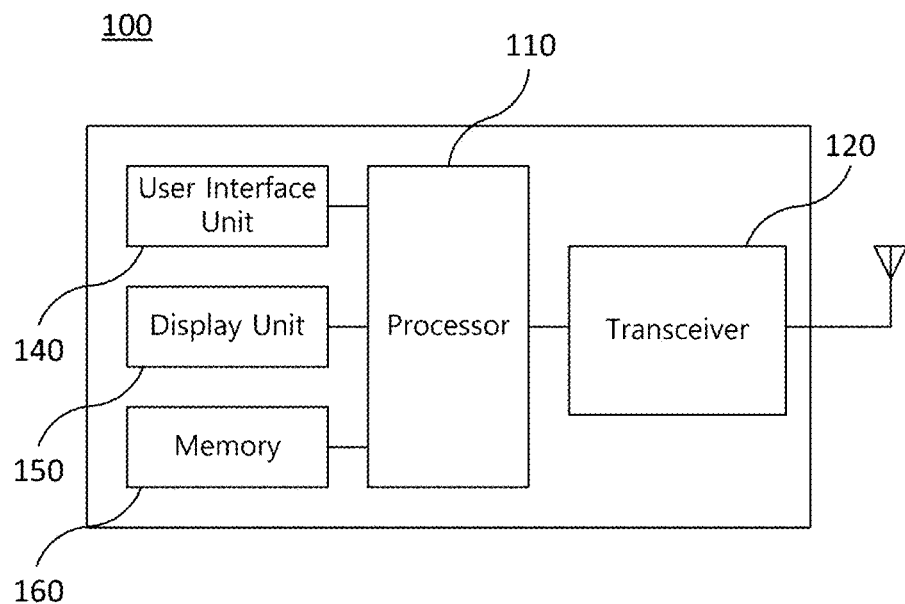
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
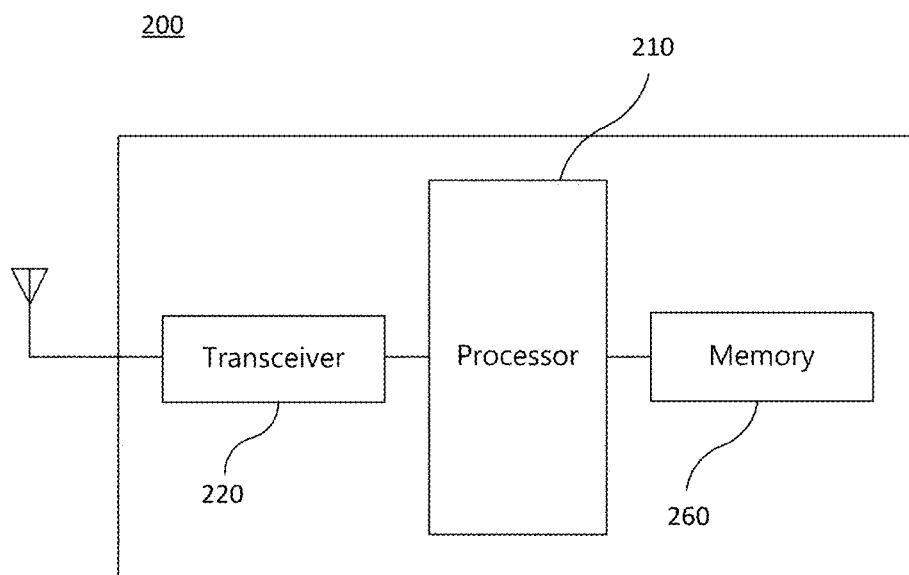
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
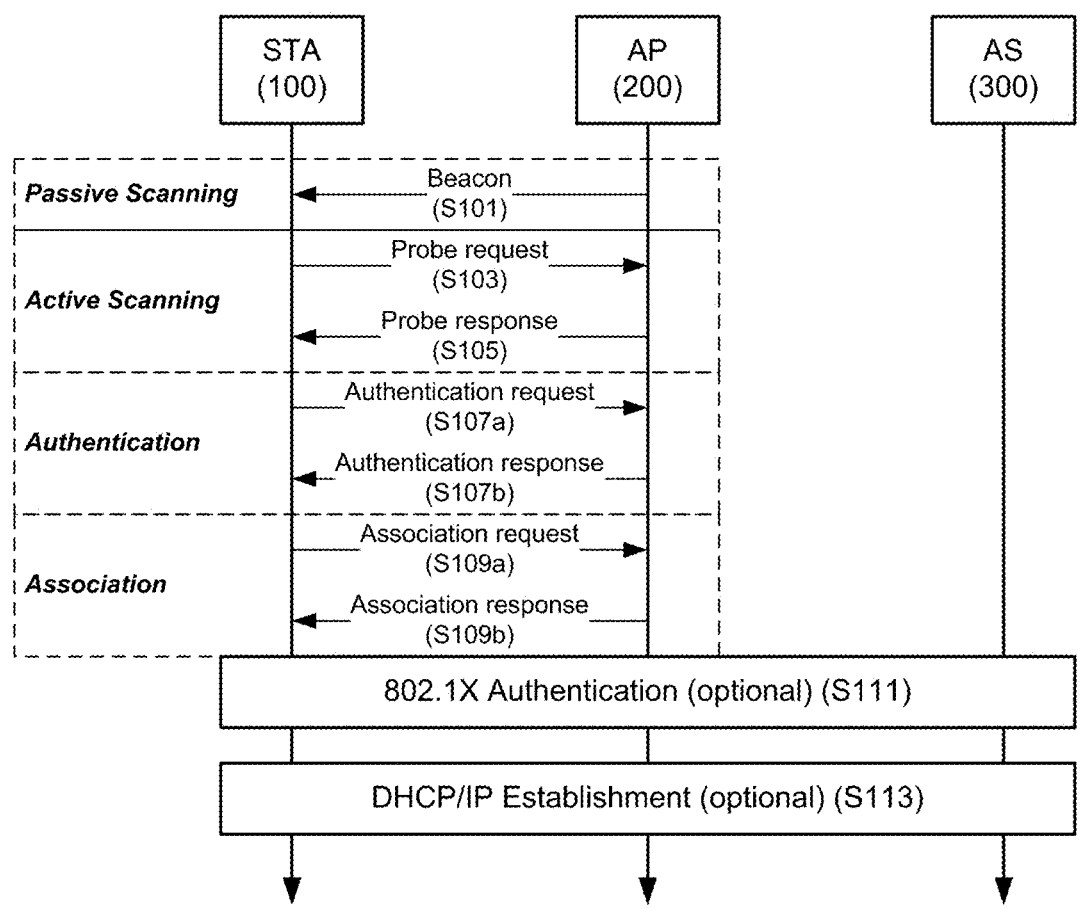
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

The wireless communication terminal may fragment the traffic to transmit the traffic. In this case, the traffic may include at least one of a MAC service data unit (MSDU), an aggregate (A)-MSDU, and a management protocol data unit (MMPDU). Specifically, the wireless communication terminal may fragment and transmit at least one of one MSDU, one A-MSDU, and one MMPDU. For convenience of explanation, a portion of an MSDU, a portion of an A-MSDU, or a portion of an MMPDU, which are generated through fragmentation, is referred to as a fragment. In addition, a wireless communication terminal that transmits data is referred to as an originator, and a wireless communication terminal that receives data is referred to as a recipient.

Specifically, the wireless communication terminal may generate a plurality of fragments by fragmenting at least one of an MSDU, an A-MSDU, and an MMPDU. In this case, the wireless communication terminal may transmit the generated plurality of fragments using a plurality of MPDUs. In addition, the wireless communication terminal receiving a plurality of fragments may defragment a plurality of fragments to obtain at least one of one MSDU, one A-MSDU, and one MMPDU. In this case, the MPDU may be an S-MPDU or an A-MPDU.

The recipient needs sufficient buffer capacity and processing capacity to defragment a plurality of fragments. For this, the originator is required to know the fragmentation level that the recipient may support. In this case, the fragmentation level can indicate the transmission method of the fragment. Therefore, the wireless communication terminal may signal the fragmentation level supported by the wireless communication terminal. The fragmentation level may be divided into four levels. Level 0 may indicate that the wireless communication terminal is not capable of fragmenting for the received MSDU. Also, level 1 may indicate that the wireless communication terminal is capable of receiving an MPDU that includes one fragment. In this case, the MPDU may be a single MPDU that is not aggregated with another MPDU, or an MPDU that is not an A-MPDU. Also, level 2 may indicate that the wireless communication terminal is capable of receiving an A-MPDU that includes one fragment per MSDU. Specifically, level 2 may indicate that the wireless communication terminal is capable of receiving an A-MPDU that includes one or fewer fragments per MSDU. Level 3 may indicate that the wireless communication terminal is capable of receiving an A-MPDU including a plurality of fragments per MSDU. Specifically, level 3 may indicate that the wireless communication terminal is capable of receiving an A-MPDU including four or fewer fragments per MSDU.

In addition, the wireless communication terminal may obtain the right to use the wireless medium through a contention procedure or be granted the right to use the wireless medium. An interval of time during which a wireless communication terminal has a right to initiate a frame exchange sequence in a wireless medium is referred to as a transmission opportunity (TXOP). The TXOP may be defined with a start time and a maximum duration. Also, frames may be exchanged as an immediate response within the TXOP. In this case, the immediate response indicates that the response frame is transmitted at predetermined time intervals. The predetermined time may be a Short Inter-Frame Space (SIFS). A wireless communication terminal that obtains a TXOP through a contention procedure or is granted a TXOP is referred to as a TXOP holder. Also, a wireless communication terminal that transmits a frame in response to a frame transmitted from a TXOP holder in a frame exchange sequence is referred to as a TXOP responder. In this case, the frame may be used as the MAC frame in the same meaning as the MPDU described above. In order to prevent any one wireless communication terminal from monopolizing the wireless medium for a long time, the maximum value of the TXOP duration may be defined. The maximum value of the TXOP duration is referred to as the TXOP limit. In this case, the TXOP limit may be defined for each Enhanced Distributed Channel Access Function (EDCAF).

In relation to the fragmentation operation of the wireless communication terminal, the TXOP limit may be a problem. This will be described with reference to FIGS. 6 to 13.

Figure 6:
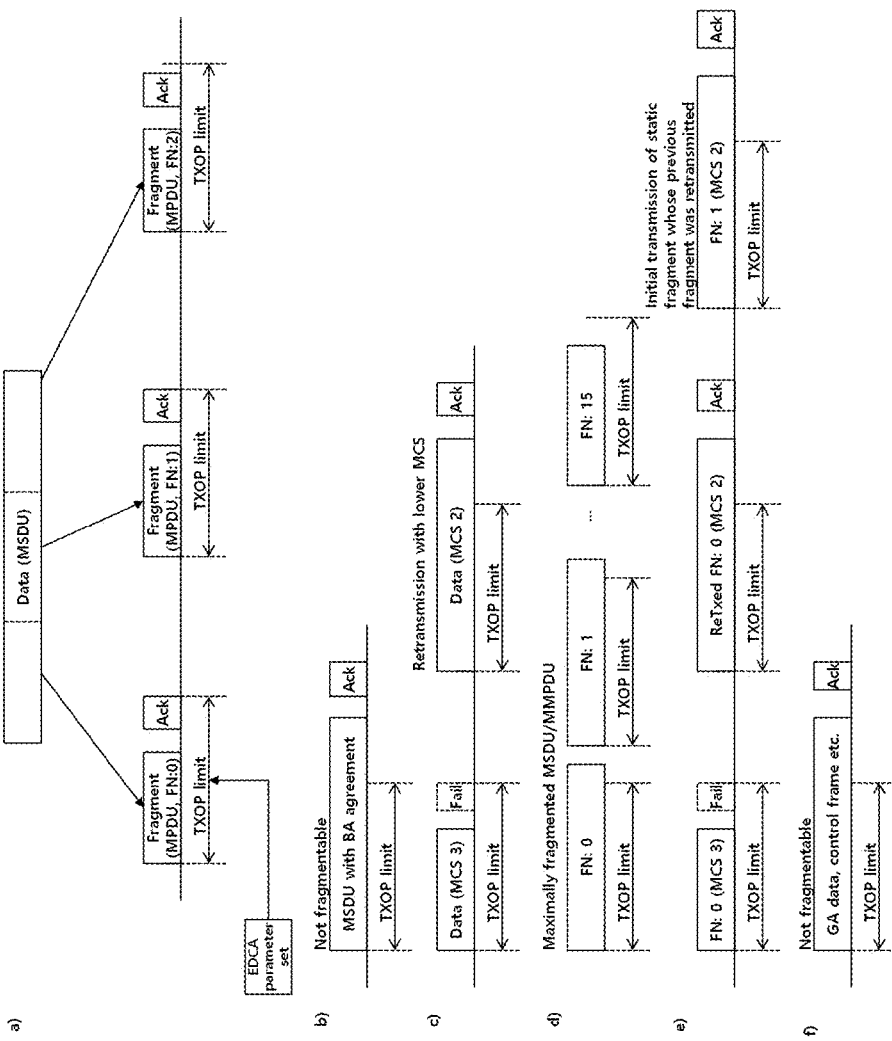
FIG. 6 shows an operation in which a wireless communication terminal performs a frame exchange based on a TXOP limit according to an embodiment of the present invention.

FIG. 6 shows an operation in which a wireless communication terminal performs a frame exchange based on a TXOP limit according to an embodiment of the present invention.

The wireless communication terminal may receive an Enhanced Distributed Channel Access (EDCA) parameter set from the base wireless communication terminal. In this case, the wireless communication terminal may set a management information base (MIB) attribute based on the received EDCA parameter set. The wireless communication terminal may exchange frames of data within a duration less than or equal to the TXOP limit. In this case, the TXOP limit may be set for each Enhanced Distributed Channel Access Function (EDCAF). When the TXOP limit corresponding to the EDCAF of the traffic to be transmitted by the wireless communication terminal is 0, the wireless communication terminal is allowed to transmit only one MPDU regardless of the duration of the MPDU. In this case, one MPDU may represent one A-MPDU. When the TXOP limit corresponding to the EDCAF of the traffic to be transmitted by the wireless communication terminal is not 0, the wireless communication terminal is allowed to transmit the data or management frame within the TXOP limit. Specifically, when it is determined that the wireless communication terminal will exceed the TXOP limit due to the duration of the data exchange sequence, the wireless communication terminal may transmit the fragment by fragmenting the data. In this case, the data may indicate an MSDU which is a payload of a MAC frame. In certain cases, the wireless communication terminal may not be able to fragment the data. In specific situations, the wireless communication terminal may exceed the TXOP limit. The specific situation may be a case where the wireless communication terminal transmits one data (MSDU) or MMPDU. In addition, a specific situation may not include a case where a wireless communication terminal aggregates and transmits two or more MPDUs. FIG. 6(a) shows that the wireless communication terminal fragments the MSDU and transmits fragments within the TXOP limit. In addition, if the wireless communication terminal attempts to transmit an Aggregate (A)-MSDU and determines that the TXOP limit will be exceeded due to the transmission of the A-MSDU, the wireless communication terminal may cancel the aggregation of the A-MSDU. Therefore, when the wireless communication terminal attempts to transmit the A-MSDU, the wireless communication terminal is not allowed to exceed the TXOP limit.

The wireless communication terminal may exceed the TXOP limit in at least one of the following situations.

1) When a wireless communication terminal transmits an MSDU corresponding to a TID with a BlockACK agreement, the wireless communication terminal may transmit an MSDU using a TXOP exceeding a TXOP limit. In this case, the BlockACK agreement may represent an agreement on the BlockACK frame transmission method. In this specification, a frame is used to refer to a MAC frame. FIG. 6(b) shows an operation of transmitting an MSDU using a TXOP exceeding a TXOP limit when a wireless communication terminal transmits an MSDU corresponding to a TID for which a BlockACK agreement exists. 2) When the wireless communication terminal transmits the previously transmitted MPDU again, the wireless communication terminal may transmit the MPDU using the TXOP exceeding the TXOP limit. In this case, the wireless communication terminal may transmit the same MPDU as the previously transmitted MPDU. When the recipient receives an MPDU with the same sequence number and fragment number as the previously received MPDU, the recipient may discard the previously received MPDU. In the embodiment of FIG. 6(c), the wireless communication terminal attempts to transmit the MPDU using Modulation and Coding Scheme 3 (MCS3). The wireless communication terminal fails to transmit the MPDU and retransmits the same MPDU using the MCS2. In this case, the wireless communication terminal exceeds the TXOP limit to retransmit the same MPDU.

3) The wireless communication terminal may fragment MSDU, MMPDU, or A-MSDU so that the size of all fragments except for the last fragment is the same and the size of the last fragment is smaller than that of other fragments. When the wireless communication terminal generates fragments by the maximum number of fragments according to this rule, the wireless communication terminal may transmit the fragments using the TXOP exceeding the TXOP limit. In this case, the maximum number of fragments may be 16. Specifically, when the wireless communication terminal generates fragments by the maximum number of fragments at the time point of attempting to transmit the first fragments, the wireless communication terminal may transmit a fragment using a TXOP exceeding the TXOP limit regardless of the fragment number of the transmitted fragment. This is because even though the wireless communication terminal generates the maximum number of fragments allowed for the fragment, the transmission of the fragment exceeds the TXOP limit. In the embodiment of FIG. 6(d), the wireless communication terminal generates 16 fragments by fragmenting the MSDU or MMPDU. In this case, 16 are the maximum number of fragments allowed. Therefore, the wireless communication terminal exceeds the TXOP limit to transmit the fragments.

4) When the wireless communication terminal first transmits a fragment corresponding to the MSDU of the previously retransmitted fragment or the MMPDU of the fragment, the wireless communication terminal may transmit the fragment using a TXOP exceeding the TXOP limit. In the embodiment of FIG. 6(e), the wireless communication terminal attempts to transmit the first fragment (FN: 0) using MCS3. The wireless communication terminal fails to transmit the fragment, and retransmits the first fragment (FN: 0) using MCS2. In this case, the wireless communication terminal retransmits the first fragment (FN: 0) using the TXOP exceeding the TXOP limit. Further, after the wireless communication terminal retransmits the first fragment (FN: 0), the wireless communication terminal transmits a first fragment (FN: 0) and a second fragment (FN: 1), which is a fragment of the corresponding MSDU or the corresponding MMPDU, using a TXOP exceeding the TXOP limit. In this case, the second fragment (FN: 1) is a fragment that is initially transmitted among the fragments of the corresponding MSDU or the corresponding MMPDU after transmitting the first fragment (FN: 0).

5) When the wireless communication terminal is not capable of fragmenting the MSDU or MMPDU, the wireless communication terminal may transmit the MSDU or MMPDU using the TXOP exceeding the TXOP limit. Specifically, the wireless communication terminal is not capable of fragmenting the group addressed MMPDU. Further, the wireless communication terminal is not capable of fragmenting the control frame. In the embodiment of FIG. 6(f), the wireless communication terminal is not capable of fragmenting the MSDU or MMPDU. Therefore, the wireless communication terminal transmits the MSDU or MMPDU using the TXOP exceeding the TXOP limit.

In the above description, the wireless communication terminal may be a TXOP holder. In addition, the wireless communication terminal exceeding the TXOP limit may represent that the wireless communication terminal performs the transmission using the TXOP exceeding the TXOP limit.

Figure 7:
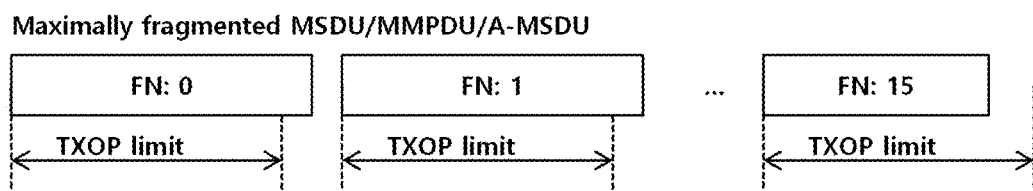
FIG. 7 shows that a wireless communication terminal according to an embodiment of the present invention dynamically performs fragmentation.

FIG. 7 shows that a wireless communication terminal according to an embodiment of the present invention dynamically performs fragmentation.

The wireless communication terminal may perform dynamic fragmentation as well as static fragmentation. The static fragmentation indicates that the wireless communication terminal generates fragments such that the size of all the fragments except for the last fragment is the same and the size of the last fragment is smaller than the size of the other fragments. Static fragments refer to fragments generated by static fragmentation. Dynamic fragmentation represents a fragmentation in which wireless communication terminals are not required to have the same size of each fragment. Specifically, in the dynamic fragmentation, the wireless communication terminal is not required to equally fragment the size of all the fragments except the last fragment. Dynamic fragments refer to fragments generated by dynamic fragmentation.

In dynamic fragmentation, a wireless communication terminal may operate according to at least one of the following principles. 1) The wireless communication terminal signals whether the wireless communication terminal supports dynamic fragmentation. 2) The wireless communication terminal should transmit the first fragment equal to or greater than the minimum size signaled by the recipient. 3) The wireless communication terminal may set the fragment level for each TID through the ADDBA extension element in the BlockACK agreement process. 4) The wireless communication terminal may fragment the A-MSDU. 5) When the fragmentation level is Level 2 or Level 3, the wireless communication terminal may transmit one fragment of the MMPDU per A-MPDU. When the fragmentation level is level 1, the wireless communication terminal may transmit the fragment of the MMPDU using a single MPDU (S-MPDU).

The wireless communication terminal may determine the fragmentation level on the traffic to be transmitted through the BLOCKACK agreement with the recipient, and may fragment the traffic to be transmitted according to the determined fragmentation level. When there is no BLOCK-ACK agreement for the recipient for the traffic to be transmitted by the wireless communication terminal, the wireless communication terminal may perform dynamic fragmentation according to the determined fragmentation level based on the capability of the recipient. In this case, the wireless communication terminal may determine the capability of the recipient based on the Capabilities Information field transmitted by the recipient. In a specific embodiment, when the value of the Capabilities Information field of the recipient is a predetermined value even though there is no BLOCKACK agreement, the wireless communication terminal may transmit the fragmented MMPDU or MSDU to the recipient according to the fragmentation level 1. In this case, the predetermined value may be 1. In addition, when the value of the Capabilities Information field of the recipient is a predetermined value even though there is no BLOCKACK agreement, the wireless communication terminal may transmit the fragmented MMPDU or MSDU to the recipient according to the fragmentation level 1 or level 2. In this case, the predetermined value may be 2. In a specific embodiment, when the value of the Capabilities Information field of the recipient is a predetermined value even though there is no BLOCKACK agreement, the wireless communication terminal may transmit the fragmented MMPDU or MSDU to the recipient according to the fragmentation level 1 or level 3. In this case, the predetermined value may be 3. In the embodiment of FIG. 7, there is no BLOCKACK agreement between an originator and a recipient. In this case, the originator determines the fragmentation level as level 1 based on the value of the Capabilities Information field transmitted by the recipient. The originator generates three dynamic fragments according to fragment level 1. In these embodiments, the wireless communication terminal may transmit the sequence and the fragment according to the sequence number and the fragment number order. In this case, when the wireless communication terminal receives the fragment of a specific sequence before a fragment that is included in the same sequence and has a fragment number that is smaller than the fragment number of the corresponding fragment, the wireless communication terminal may delete all the MPDUs including the fragments of the corresponding sequence from the cache. In addition, when the wireless communication terminal receives a specific sequence before a sequence having a sequence number smaller than the sequence number of the corresponding sequence, the wireless communication terminal may delete all MPDUs including the corresponding sequence from the cache.

In addition, a case where there is no BLOCKACK agreement with the recipient for the traffic to be transmitted by the wireless communication terminal may include a case where the wireless communication terminal transmits the MMPDU. In addition, a case where there is no BLOCKACK agreement with the recipient for the traffic to be transmitted by the wireless communication terminal may include a case of transmitting the MPDU corresponding to the TID designated by QoS No Ack. Since the retransmission is not required for the MPDU corresponding to the QoS No Ack, the wireless communication terminal may not apply the TXOP limit exception operation to the MPDU corresponding to the QoS No Ack.

When the originator and recipient negotiate dynamic fragmentation for one or more TIDs, the originator can fragment the traffic to be transmitted to the recipient according to the fragmentation level of the TID signaled in the highest fragmentation level among one or more TIDs. In this case, originator and recipient may negotiate dynamic fragmentation using ADDBA extension. In addition, the recipient may signal the fragmentation level per TID using the ADDBA response.

As described above, when the wireless communication terminal uses dynamic fragmentation, the wireless communication terminal may generate the fragment more flexibly than when using the static fragmentation. Even in situations where the wireless terminal does not comply with the TXOP limit when using static fragmentation, the wireless terminal may use the dynamic fragmentation to comply with the TXOP limit. In addition, when the wireless communication terminal uses the dynamic fragmentation, there is a possibility that the wireless communication terminal can perform transmission while corrupting the fairness with the other wireless communication terminals in an exception condition to the TXOP limit. Therefore, it is necessary to newly define the TXOP limit related operation of the wireless communication terminal.

In relation to the retransmission of the wireless communication terminal through FIGS. 8 to 11, a case where the wireless communication terminal performs retransmission using the TXOP exceeding the TXOP limit will be described. In this specification, the fact that the wireless communication terminal exceeds the TXOP limit may refer to performing a data exchange sequence from the start time point of the TXOP to the maximum duration indicated by the TXOP limit.

Figure 8:
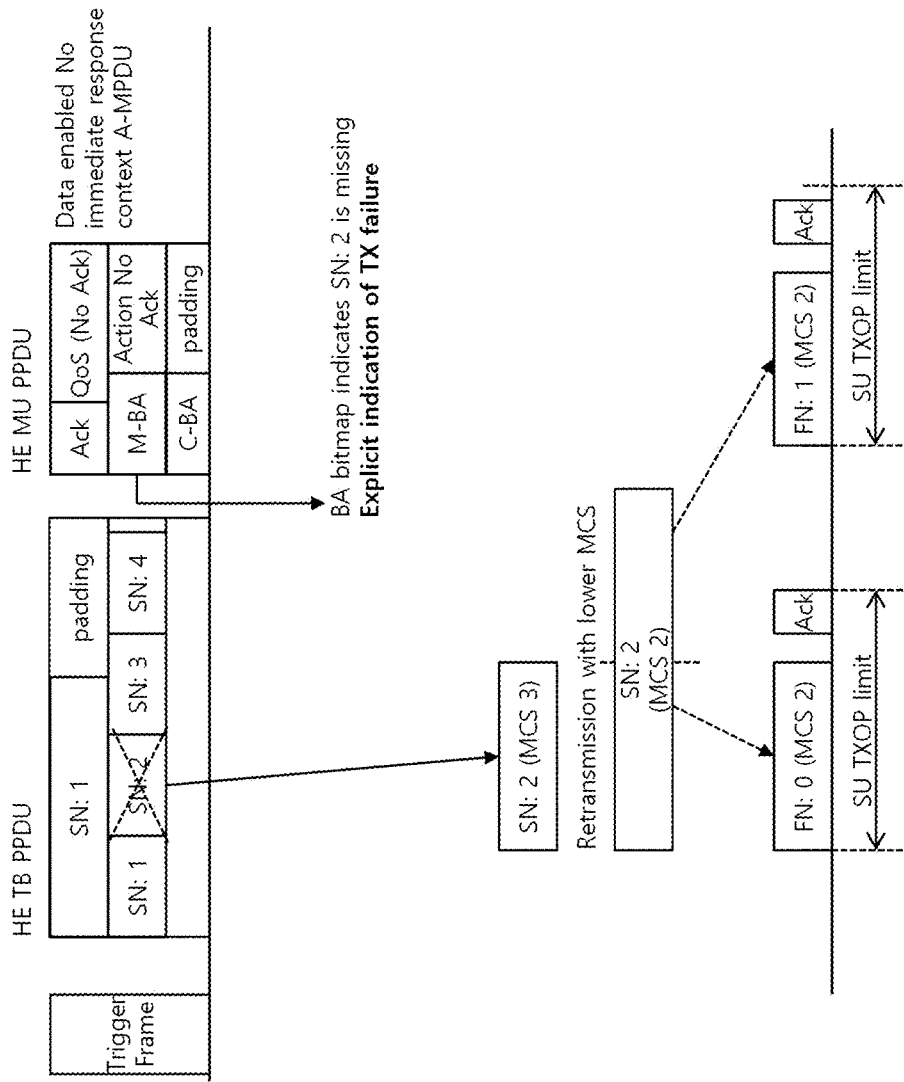
FIG. 8 shows an operation of a wireless communication terminal according to an embodiment of the present invention to determine a recipient reception failure and a retransmission operation.

FIG. 8 shows an operation of a wireless communication terminal according to an embodiment of the present invention to determine a recipient reception failure and a retransmission operation.

When a wireless communication terminal according to an embodiment of the present invention transmits a frame indicating whether data is received, such as an ACK frame, a Compressed (C)-BA, and a Multi-Station (M)-BA frame, using an A-MPDU, the wireless communication terminal may insert a frame indicating whether it is received into the first MPDU of the A-MPDU. In this case, whether it is received may indicate that the wireless communication terminal successfully receives the traffic. Successful reception of the traffic may indicate that the traffic received by the wireless communication terminal is verified by the verification using the Frame Check Sequence (FCS) field. Also, successful transmission in this specification may indicate that the traffic transmitted by the wireless communication terminal is verified by the verification of the recipient using the FCS field. Therefore, the wireless communication terminal according to an embodiment of the present invention may determine whether the reception of the recipient is successful based on whether the A-MPDU received by the wireless communication terminal includes a frame indicating whether it is received or not at a predetermined position. Specifically, when the A-MPDU received by the wireless communication terminal does not include a frame indicating whether it is received, the wireless communication terminal may determine that the recipient fails to receive the traffic previously transmitted by the wireless communication terminal. In addition, the wireless communication terminal according to an embodiment of the present invention may determine whether the recipient fails to receive the traffic previously transmitted by the wireless communication terminal based on the BA bitmap field included in the frame indicating whether it is received. Specifically, when each bit of the BA bitmap field of the BA frame received by the wireless communication terminal indicates 0, the wireless communication terminal may determine that the transmission of the traffic corresponding to the bit fails. In this case, the BA frame may be any one of an M-BA frame, a C-BA frame, and a general BA frame.

In the embodiment of FIG. 8, the access point transmits a trigger frame that triggers the uplink transmission of the first station. The first station receives the trigger frame and transmits a trigger-based PPDU (HE TB PPDU) based on the trigger frame. In this case, the access point fails to receive one MPDU (SN: 2) included in the trigger-based PPDU. The access point transmits a multi-user PPDU (HE MU PPDU) including a BA frame indicating whether the MPDU received from the first station is received.

The wireless communication terminal according to an embodiment of the present invention can distinguish an ACK frame transmission failure of a recipient from a transmission failure of a wireless communication terminal through such embodiments. When the wireless communication terminal retransmits the traffic with an MCS lower than the MCS used previously, the wireless communication terminal may fragment the traffic that failed to be transmitted and transmit the fragment having the changed size. Thus, the wireless communication terminal may retransmit the traffic without exceeding the TXOP limit. This will be described with reference to FIG. 9.

Figure 9:
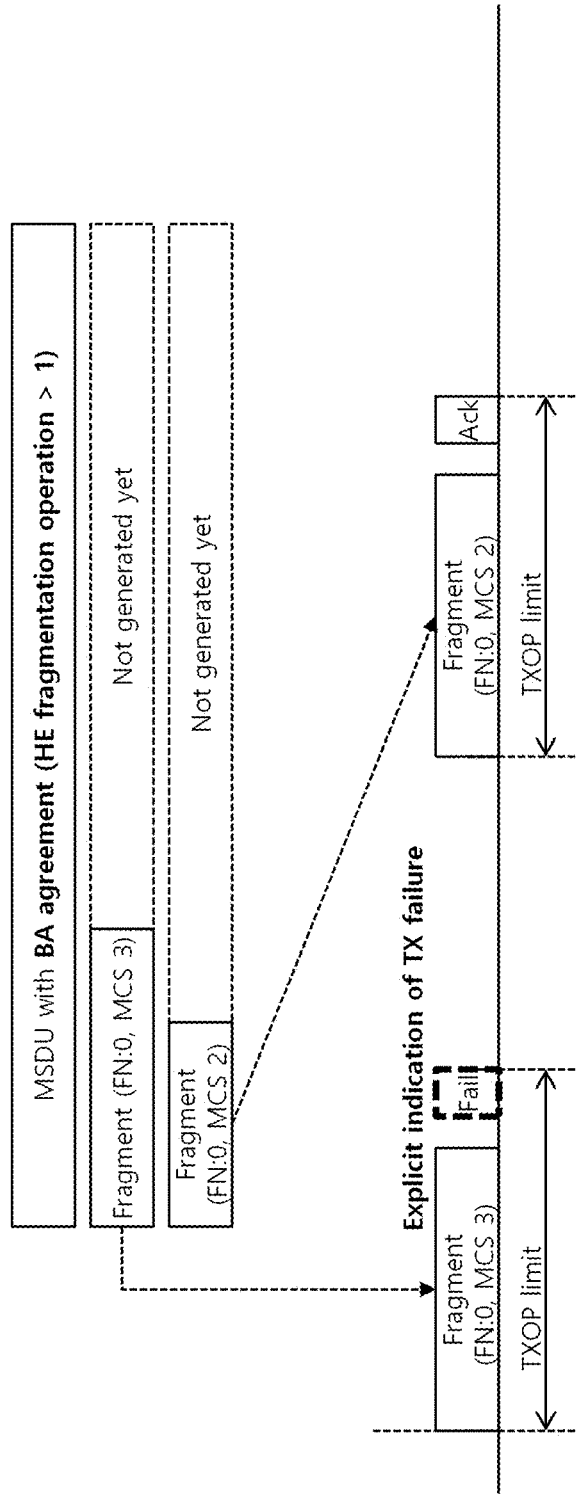
FIGS. 9 to 10 illustrate operations in which a wireless communication terminal according to an embodiment of the present invention performs retransmission within a TXOP limit.
Figure 10:
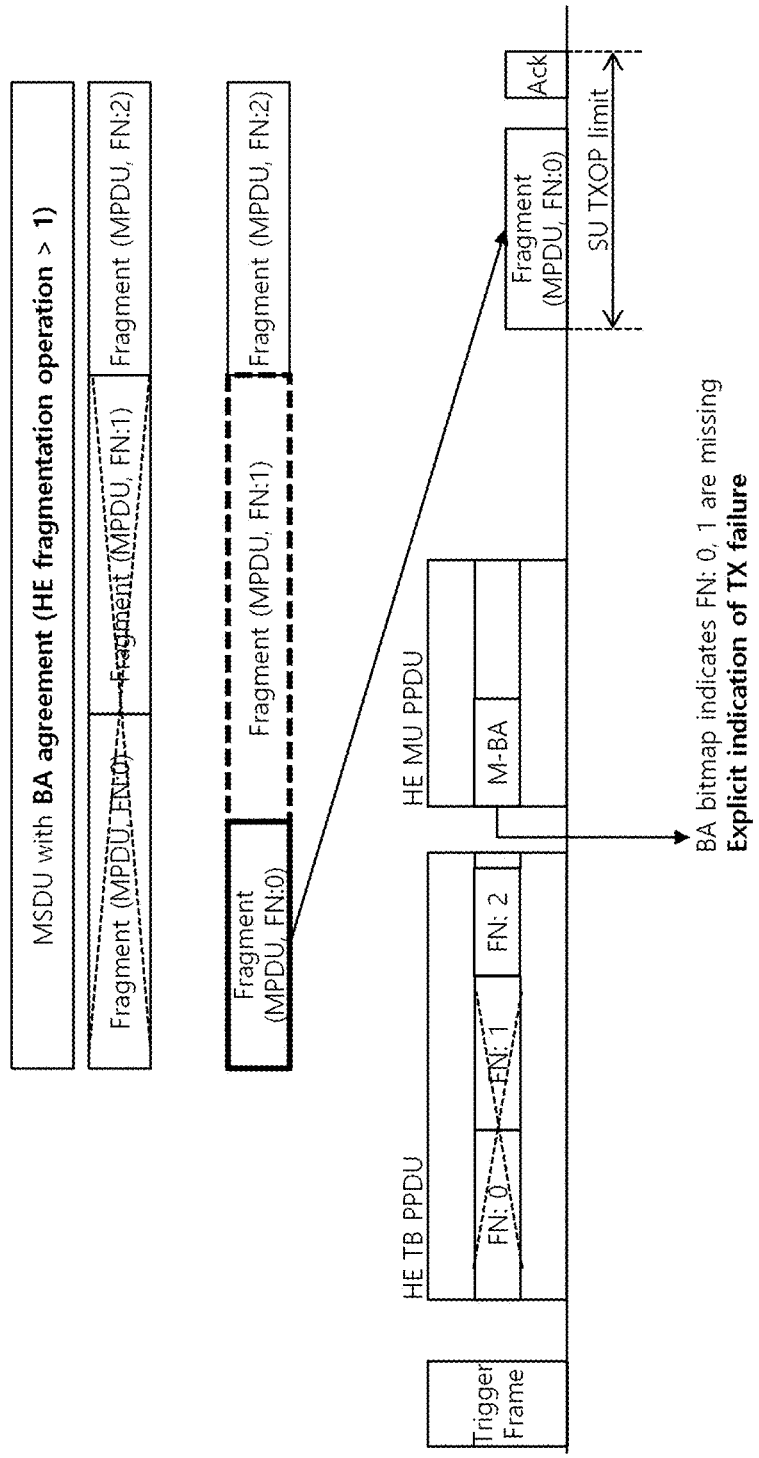

FIGS. 9 to 10 illustrate operations in which a wireless communication terminal according to an embodiment of the present invention performs retransmission within a TXOP limit.

When the wireless communication terminal retransmits the fragment, the wireless communication terminal may perform different retransmission operations based on whether the recipient successfully receives a fragment having a fragment number that is larger than the fragment number of the fragment that the recipient fails to receive in the sequence including the fragment that the recipient fails to receive. For convenience of explanation, the fragment that the recipient fails to receive are referred to as the failed fragment. In addition, a fragment having a fragment number larger than the fragment number of the failed fragment is referred to as a fragment following the failed fragment. When it is not known that whether the wireless communication terminal receives an ACK for a fragment following the failed fragment or the recipient receives a fragment following the failed fragment, the wireless communication terminal is not allowed to generate a fragment having sizes different from the size of the failed fragment for retransmission. In this case, the wireless communication terminal may retransmit the fragment having a size equal to the size of the failed fragment. In addition, the wireless communication terminal may transmit the fragment having a size equal to the size of the failed fragment within the TXOP limit.

Based on at least one of whether the wireless communication terminal does not transmit a fragment following the failed fragment and whether the recipient explicitly fails to receive a fragment following the failed fragment, the wireless communication terminal may generate a fragment having a size different from the size of the failed fragment for retransmission. In this case, instead of retransmitting the failed fragment, the wireless communication terminal may retransmit the fragment having a size different from the size of the failed fragment. Specifically, when the wireless communication terminal fails to transmit a fragment following the failed fragment, or when the recipient explicitly fails to receive a fragment following the failed fragment, the wireless communication terminal may generate a fragment having a size different from the size of the failed fragment for retransmission. In a specific embodiment, the wireless communication terminal may again fragment the failed fragment. Also, the wireless communication terminal may allocate the same fragment number as the fragment number of the failed fragment and the same sequence number as the sequence number of the failed fragment to a fragment having a size different from the size of the failed fragment. Also, instead of retransmitting the failed fragment, the wireless communication terminal may transmit a fragment having a size different from the size of the failed fragment using a TXOP exceeding the TXOP limit.

In the embodiment of FIG. 9, the wireless communication terminal transmits a fragment having a fragment number of 0 using the MCS3. The wireless communication terminal determines that the recipient explicitly fails to receive the reception of the fragment having the fragment number of 0. Therefore, a fragment having a fragment number of 0 is a failed fragment. A fragment having a larger fragment number than the failed fragment in the same sequence is not transmitted. Therefore, the wireless communication terminal generates a fragment having a smaller size than the failed fragment for retransmission, and allocates a fragment number 0 to the generated fragment. Instead of transmitting the same fragment as the previously transmitted fragment, the wireless communication terminal transmits the generated fragment with the MCS2. In this case, the wireless communication terminal transmits the generated fragment within the TXOP limit.

In addition, the recipients may fail to receive a plurality of fragments included in the same sequence and having successive fragmentation numbers. In this case, the wireless communication terminal may generate a fragment having a different size from at least one of the plurality of failed fragments for retransmission regardless of whether the recipient successfully receives fragments following the plurality of failed fragments. Specifically, the wireless communication terminal may change the size of a failed fragment regardless of whether the recipient successfully receives a fragment following the plurality of failed fragments.

In the embodiment of FIG. 10, the access point transmits a trigger frame that triggers the uplink transmission of the first wireless communication terminal. The first station receives the trigger frame and transmits a trigger-based PPDU (HE TB PPDU) based on the trigger frame. In this case, the trigger-based PPDU includes an A-MPDU including three fragments having the fragment numbers 1, 2, and 3 included in the same sequence. The access point receives the trigger-based PPDU (HE TB PPDU) from the first station. In this case, the access point fails to receive a fragment having a fragment number of 0 and a fragment having a fragment number of 1. The access point transmits a multi-user PPDU including an M-BA frame that explicitly indicates the reception failure of the fragment having the fragment number of 0 and the fragment having the fragment number of 1. Since the transmission of two fragments with successive fragment numbers fails, the first station generates a fragment having a size different from the size of the failed fragment for retransmission and allocates a fragment number 0 to the generated fragment. The wireless communication terminal transmits the generated fragment within the TXOP limit.

Figure 11:
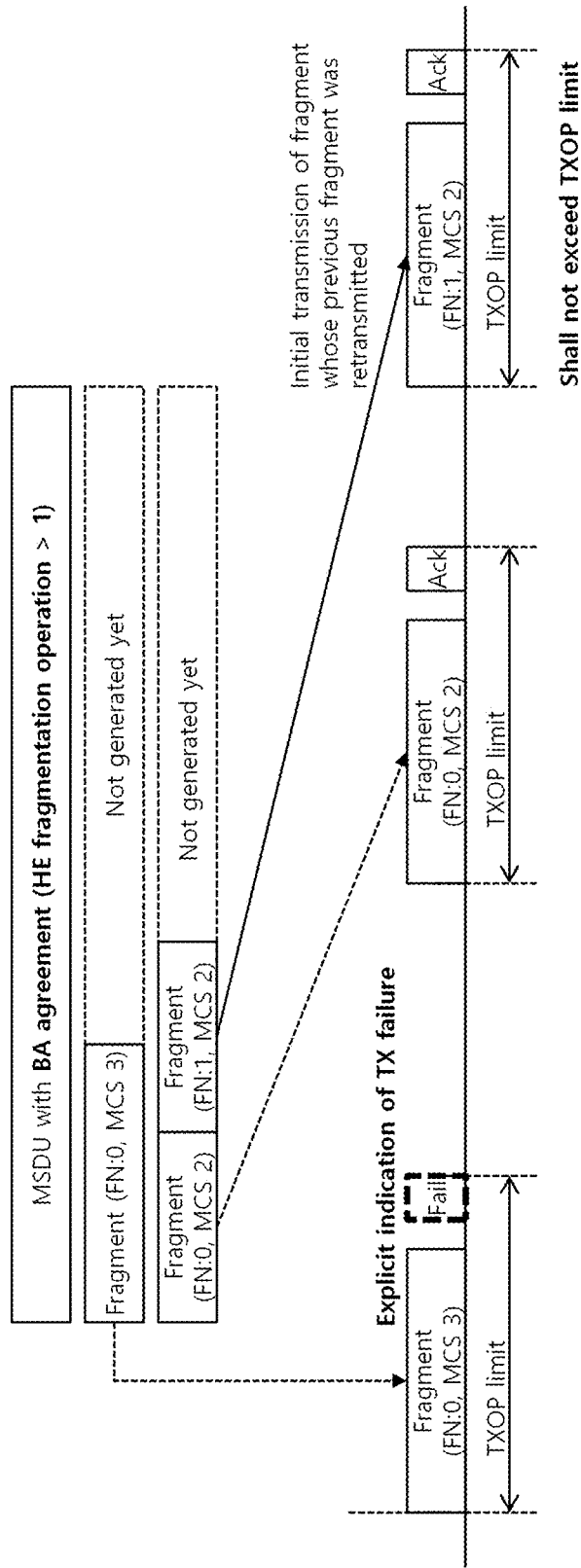
FIG. 11 shows an operation in which a wireless communication terminal according to another embodiment of the present invention retransmits fragments included in the same sequence as a retransmitted fragment after retransmission within a TXOP limit.

FIG. 11 shows an operation in which a wireless communication terminal according to another embodiment of the present invention retransmits fragments included in the same sequence as a retransmitted fragment after retransmission within a TXOP limit.

As described above, when the wireless communication terminal first transmits a fragment corresponding to the MSDU of the retransmitted fragment or the MMPDU of the fragment after retransmission, the wireless communication terminal may transmit the fragment using a TXOP exceeding the TXOP limit. When the wireless communication terminal lowers the MCS to retransmit due to a failure in the previous transmission, this is because there is a high possibility of maintaining the lowered MCS even after the retransmission. When the wireless communication terminal uses dynamic fragmentation, the wireless communication terminal may adjust the size of the fragment to be transmitted after retransmission. Therefore, when the wireless communication terminal uses dynamic fragmentation, even if the wireless communication terminal first transmits the fragment corresponding to the MSDU of the previously retransmitted fragment or the MMPDU of the fragment after retransmission, it may not be allowed for the wireless communication terminal to transmit the corresponding fragment using a TXOP exceeding the TXOP limit. Specifically, when the wireless communication terminal uses dynamic fragmentation, even if the wireless communication terminal first transmits the fragment corresponding to the MSDU of the previously retransmitted fragment or the MMPDU of the fragment after retransmission, the wireless communication terminal may transmit the corresponding fragment only within a TXOP limit.

In the embodiment of FIG. 11, the wireless communication terminal transmits a fragment having a fragment number of 0 with the MCS3. The recipient fails to receive a fragment having a fragment number of 0. A fragment having a fragment number greater than 0 is not generated in the same sequence. Therefore, the wireless communication terminal regenerates the fragment having a smaller size than the size of the transmission failed fragment, and allocates the fragment number 0 to the generated fragment. The wireless communication terminal transmits the corresponding fragment with the MCS2 within the TXOP limit. Also, the wireless communication terminal generates a fragment of the same sequence as the transmission failed fragment, and allocates the fragment number 1 to the generated fragment. Since the wireless communication terminal first performs transmission after retransmission but uses dynamic fragmentation, the wireless communication terminal transmits a fragment having a fragment number of 1 within the TXOP limit.

Figure 12:
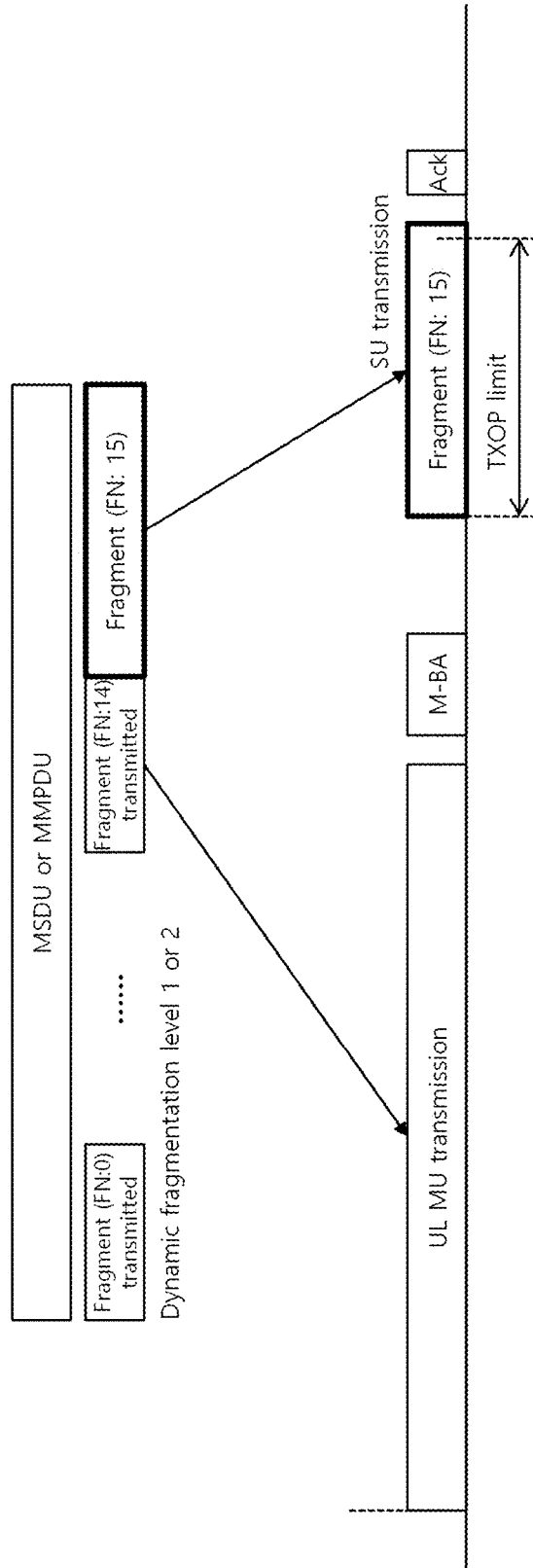
FIGS. 12 to 13 show a transmission operation exceeding a TXOP limit when a wireless communication terminal according to an embodiment of the present invention uses dynamic fragmentation.
Figure 13:
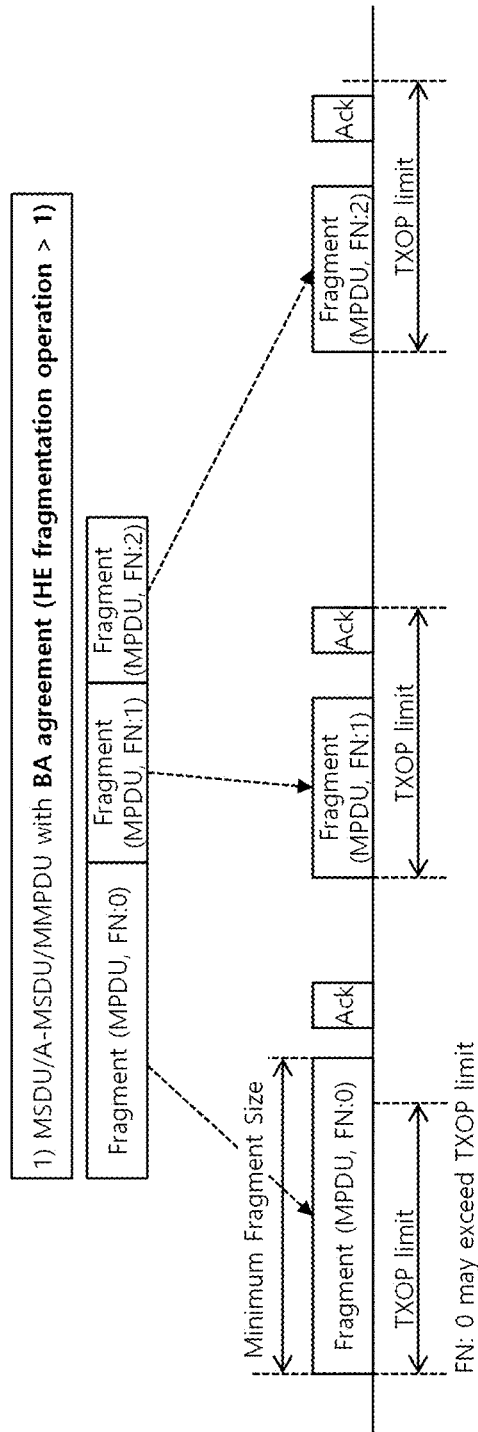

FIGS. 12 to 13 show a transmission operation exceeding a TXOP limit when a wireless communication terminal according to an embodiment of the present invention uses dynamic fragmentation.

When the wireless communication terminal generates fragments by the maximum number that may be generated by the dynamic fragmentation, the wireless communication terminal may transmit the last generated fragment among the generated fragments using the TXOP exceeding the TXOP limit. In addition, the maximum number of fragments that the wireless communication terminal is capable of generating in dynamic fragmentation may be 16. Therefore, the wireless communication terminal may transmit the 16th frame of traffic using the TXOP exceeding the TXOP limit. Also, the traffic may be an MSDU, an MMPDU, or an A-MSDU as described above. In a specific embodiment, the wireless communication terminal may determine the level of fragmentation as level 1 or level 2 and fragment the MSDU, MMPDU or A-MSDU according to the determined fragmentation level. In addition, the wireless communication terminal may be a TXOP holder. In addition, when the wireless communication terminal transmits the trigger-based PPDU based on the trigger frame, the wireless communication terminal may fragment the A-MSDU to transmit. In this case, the wireless communication terminal is not a TXOP holder. Therefore, even in this case, the wireless communication terminal may transmit the last generated fragment among the fragments generated using the TXOP exceeding the TXOP limit.

In the embodiment of FIG. 12, the wireless communication terminal generates fragments by dynamically fragmenting the traffic, and transmits the generated fragments. In this case, the wireless communication terminal generates 16 fragments that are the maximum number of fragments that can be generated by the wireless communication terminal. The wireless communication terminal transmits the 16th transmission frame using the TXOP exceeding the TXOP limit.

As described above, when the wireless communication terminal generates the first dynamic fragment in the dynamic fragmentation, the wireless communication terminal may be required to generate a dynamic fragment having a size greater than or equal to the minimum size specified by the recipient. In this case, the first dynamic fragment represents the first generated dynamic fragment. Therefore, when the wireless communication terminal generates the first dynamic fragment based on the value that the recipient specifies as the minimum size of the fragment, the wireless communication terminal may transmit the first dynamic fragment using a TXOP exceeding the TXOP limit. Specifically, when the wireless communication terminal generates the first dynamic fragment based on the value specified by the recipient as the minimum size of the fragment, and transmits the first dynamic fragment without using the A-MPDU including a plurality of MPDUs, the wireless communication terminal may transmit the first dynamic fragment using a TXOP exceeding the TXOP limit. The case where a wireless communication terminal transmits a first dynamic fragment without using an A-MPDU including a plurality of MPDUs may represent a case where a fragment is transmitted by using a single MPDU. In addition, the wireless communication terminal may be limited to generating the first dynamic fragment having a size equal to the value that the recipient specifies as the minimum size of the fragment. This is because, if the wireless communication terminal generates a dynamic fragment having an excessively large size, the fairness with other wireless communication terminals may be a problem.

In the embodiment of FIG. 13, the wireless communication terminal generates a plurality of fragments by dynamically fragmenting the traffic. In this case, the wireless communication terminal generates the first generated fragment (FN: 0) with the minimum fragment size designated by the recipient. The wireless communication terminal transmits the corresponding fragment to the recipient using the TXOP exceeding the TXOP limit. Then, the wireless communication terminal transmits the second and third transmitted fragments FN: 1 and FN: 2 within the TXOP limit.

Further, in the specific embodiment, when the wireless communication terminal transmits the first fragment of the A-MSDU, the embodiment of the TXOP limit compliance exception described with reference to FIG. 13 may not apply. This is because there is a high possibility that the wireless communication terminal can disassemble the A-MSDU.

The embodiments described with reference to FIGS. 5 to 13 may be applied to the transmission operation of the TXOP holder. There is a case where a wireless communication terminal that is not a TXOP holder can transmit data. Specifically, when a wireless communication terminal participates in an uplink (UL) multi-user (MU) transmission, a wireless communication terminal that is not a TXOP holder may also transmit data. In such a way, if the originator that is not the TXOP holder transmits data, the originator's TXOP limit related operation is problematic. This will be described with reference to FIGS. 14 to 16.

Figure 14:
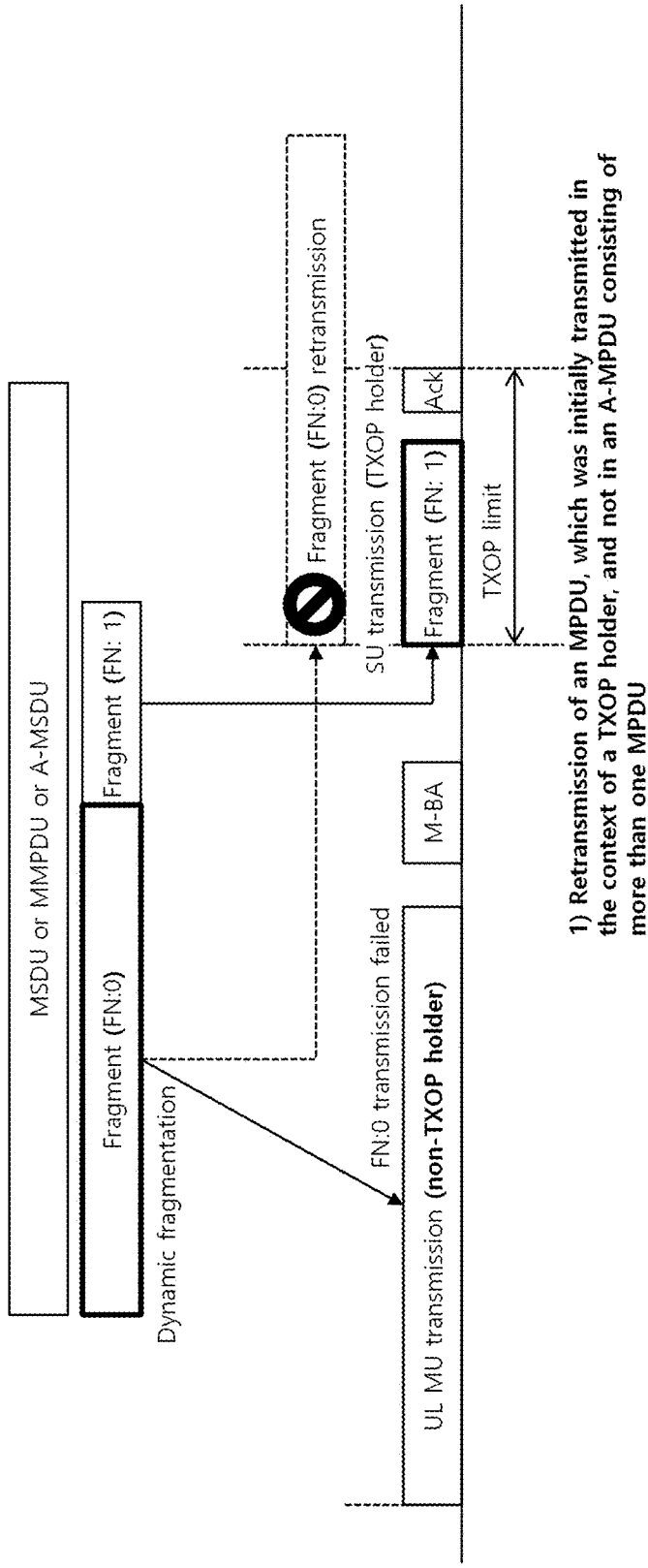
FIG. 14 shows a retransmitting operation of a wireless communication terminal, not a TXOP holder, according to an embodiment of the present invention.

FIG. 14 shows a retransmitting operation of a wireless communication terminal, not a TXOP holder, according to an embodiment of the present invention.

When the wireless communication terminal participates in UL MU transmission, the wireless communication terminal may transmit data even if the wireless communication terminal is not a TXOP holder. In this case, the wireless communication terminal can set the TXOP limit differently from TXOP limit of the base wireless communication terminal which is the TXOP holder. Therefore, there is a possibility that the wireless communication terminal increases the efficiency of UL MU transmission by using a TXOP which is much larger than the TXOP limit used in single user (SU) transmission. The wireless communication terminal may perform the uplink transmission using the TXOP which is much larger than the TXOP limit used in the SU transmission and the base wireless communication terminal may not successfully receive the data transmitted through the uplink transmission. In this case, the wireless communication terminal can attempt retransmission using a very large TXOP once again. Therefore, when the wireless communication terminal is allowed to perform retransmission using the TXOP exceeding the TXOP limit when performing retransmission, this can damage the fairness with other wireless communication terminals. In order to prevent this, when the wireless communication terminal attempts retransmission due to UL MU transmission failure, the wireless communication terminal may perform retransmission only using UL MU transmission.

In the embodiment of FIG. 14, a wireless communication terminal that is not a TXOP holder transmits one fragment (FN: 0) to a base wireless communication terminal through UL MU transmission. The base wireless communication terminal transmits an M-BA frame M-BA indicating that the wireless communication terminal does not successfully receive one fragment (FN: 0). The wireless communication terminal receives the M-BA frame from the base wireless communication terminal. The wireless communication terminal fails to transmit the MU. Therefore, the wireless communication terminal transmits a fragment (FN: 1) other than the fragment (FN: 0) that fails to be transmitted through the SU transmission.

The embodiment described with reference to FIG. 14 may be applied to transmission in addition to UL MU transmission. This is because in addition to the UL MU transmission, a wireless communication terminal that is not the TXOP holder can transmit data. Specifically, when the base wireless communication terminal and the wireless communication terminal use the reverse direction method during one-to-one transmission, the wireless communication terminal that is not the TXOP holders can also transmit data. This will be described with reference to FIGS. 15 to 16.

Figure 15:
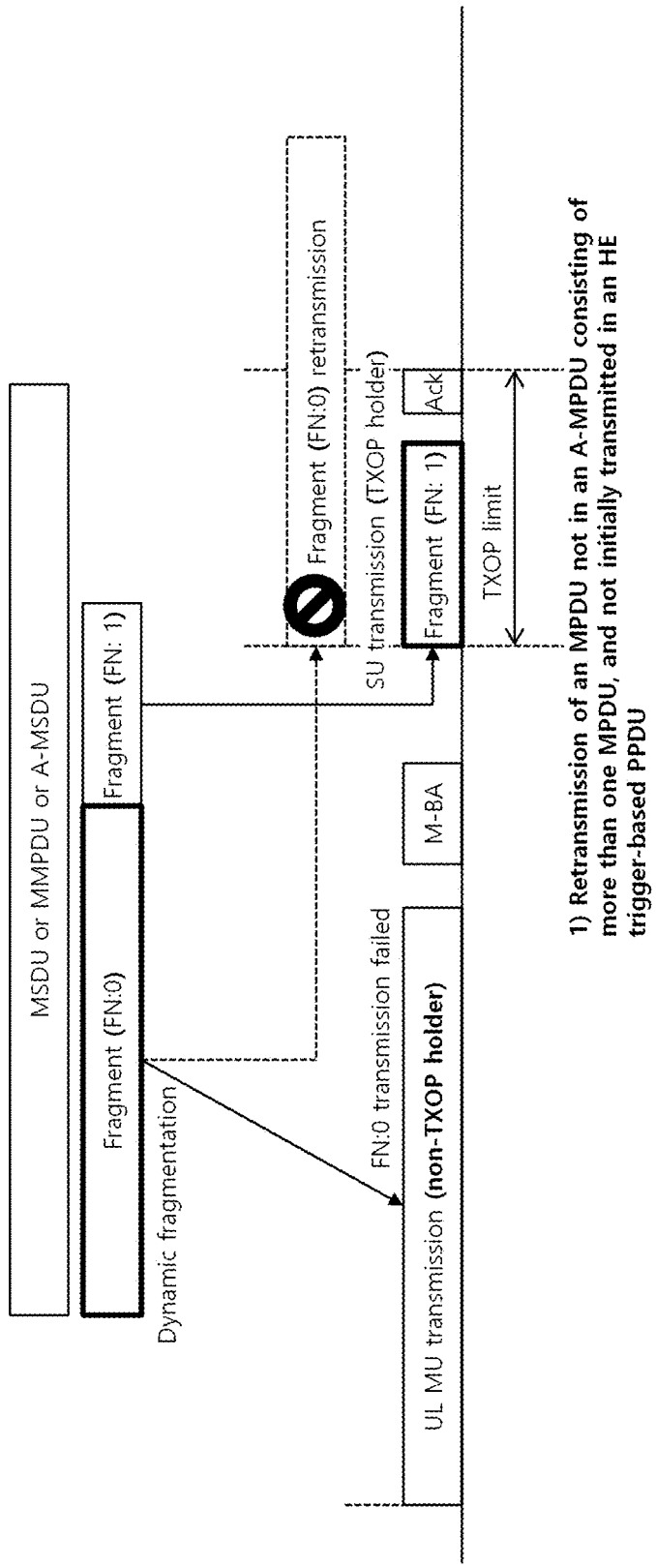
FIGS. 15 to 16 show a retransmitting operation of a wireless communication terminal, not a TXOP holder, according to another embodiment of the present invention.
Figure 16:
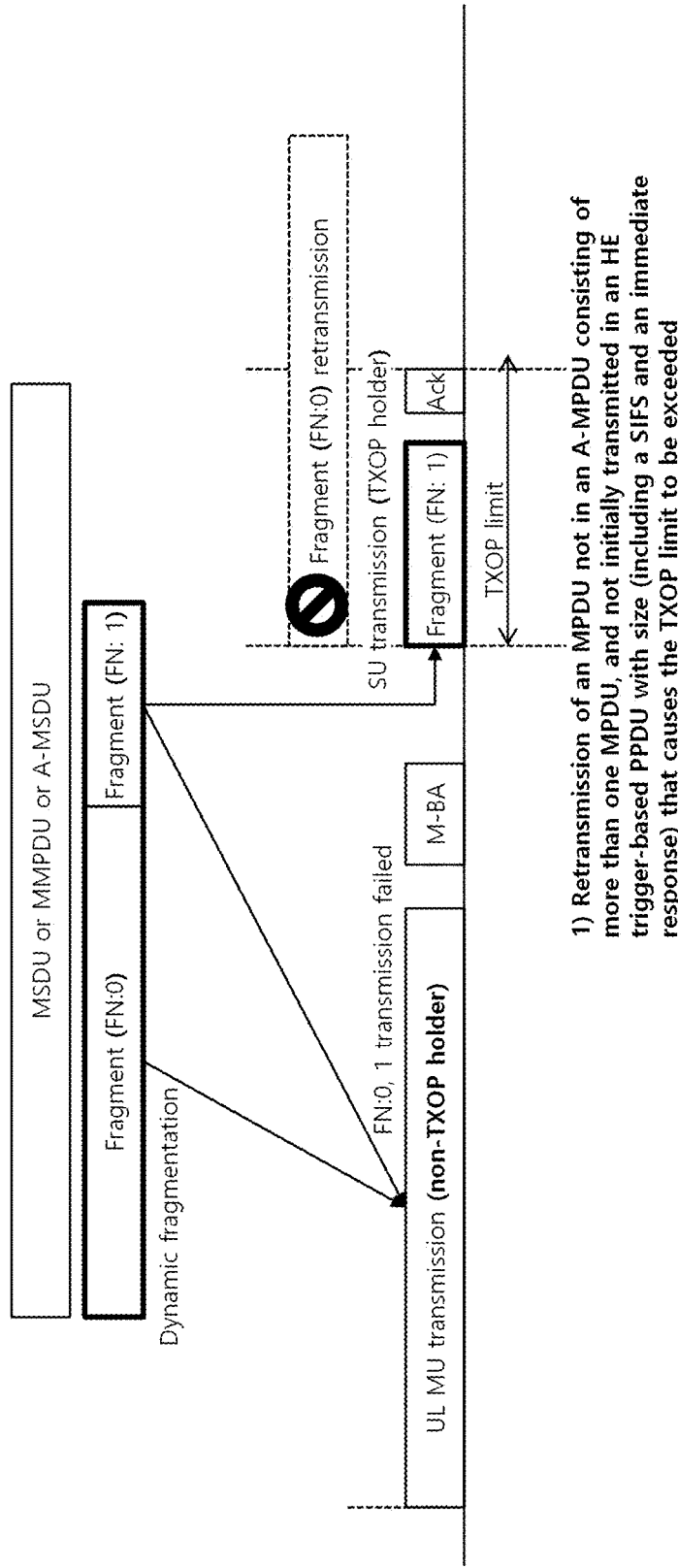

FIGS. 15 to 16 show a retransmitting operation of a wireless communication terminal, not a TXOP holder, according to another embodiment of the present invention.

The effect of retransmission of MPDUs transmitted in UL MU transmission and retransmission of MPDUs transmitted in reverse direction transmission on TXOP management may be very small. Therefore, when the retransmission is retransmission for transmission failure using the trigger-based PPDU, the wireless communication terminal may perform the retransmission only using the trigger-based PPDU.

In the embodiment of FIG. 15, a wireless communication terminal that is not a TXOP holder transmits one fragment (FN: 0) to a base wireless communication terminal through UL MU transmission. The base wireless communication terminal transmits an M-BA frame M-BA indicating that the wireless communication terminal does not successfully receive one fragment (FN: 0). The wireless communication terminal receives the M-BA frame from the base wireless communication terminal. The wireless communication terminal fails in transmission using the trigger-based PPDU. Therefore, the wireless communication terminal transmits a fragment (FN: 1) other than the fragment (FN: 0) that failed to be transmitted through the SU transmission.

When following the embodiments described with reference to FIGS. 14 to 15, the wireless communication terminal can not retransmit all the MPDUs transmitted in the UL MU using the SU transmission. If the wireless communication terminal attempts retransmission due to transmission failure using the trigger-based PPDU and the duration of the transmission sequence required for retransmission of the wireless communication terminal does not exceed the TXOP limit, the wireless communication terminal can perform the corresponding retransmission by using the SU transmission. In this case, the transmission sequence required for retransmission may include a predetermined time interval between retransmission and response transmission for retransmission, and a time required to receive a response to retransmission. Specifically, the response to the retransmission may be an immediate response that is transmitted within a predetermined time from the reception of the frame that is the response target. Also, the predetermined time interval between retransmission and response transmission for retransmission may be Short Inter-Frame Space (SIFS). The response to retransmission may be an ACK frame. In this case, the time required for the retransmission sequence may be calculated based on the MCS used in the UL MU transmission. Further, the time required for the retransmission sequence may be calculated based on the specific frequency bandwidth. In this case, the specific frequency bandwidth may be the maximum frequency bandwidth allowed in the SU transmission in the BSS including the wireless communication terminal. In addition, the specific frequency bandwidth may be 20 MHz. In addition, the specific frequency bandwidth may be a frequency bandwidth in which the size of an Resource Unit (RU) used in UL MU transmission is rounded up to a multiple of 20 MHz.

In the embodiment of FIG. 16, a wireless communication terminal that is not a TXOP holder transmits one fragment (FN: 0) to a base wireless communication terminal through UL MU transmission. The base wireless communication terminal transmits an M-BA frame M-BA indicating that the wireless communication terminal does not successfully receive one fragment (FN: 0). The wireless communication terminal receives the M-BA frame from the base wireless communication terminal. The wireless communication terminal fails to transmit the MU. The wireless communication terminal calculates the time required for the transmission sequence required for retransmission of one fragment (FN: 0). The time required for the transmission sequence calculated by the wireless communication terminal exceeds the TXOP limit. Therefore, the wireless communication terminal transmits a fragment (FN: 1) other than the fragment (FN: 0) that fails to be transmitted through the SU transmission.

In order for a wireless communication terminal to perform Multi Input Multi Output (MIMO) or beamforming, it is required to receive a channel state from a recipient. A wireless communication terminal that is to perform MIMO or beamforming receives a channel state through a sounding protocol sequence as follows. For convenience of explanation, a wireless communication terminal that is to perform MIMO or beamforming transmission is referred to as a beamformer, and a wireless communication terminal that is to perform MIMO or beamforming reception is referred to as a beamformee. The beamformer transmits a Null Data Packet Announcement (NDPA) frame to indicate that the sounding protocol sequence is initiated. In this case, the NDPA frame may include information on a beamformee, which is a wireless communication terminal is to measure a channel state. The beamformer transmits a Null Data Packet (NDP) frame, which is used for measuring the channel state and does not include a data field. In this case, the beamformer may transmit the NDP frame after a predetermined time from the transmission of the NDPA frame. At this point, the predetermined time may be a SIFS. The beamformee measures the channel state based on the NDP frame. The beamformee transmits a feedback frame indicating the measured channel state to the wireless communication terminal that transmitted the NDP frame. In this case, the feedback frame may be a compressed feedback frame including a compressed type field rather than a general feedback frame. Since the size of the feedback frame can be very large, the beamformee is required to occupy the wireless medium for a long time. Therefore, if the beamformer sets a very small TXOP limit on the AC attempting to transmit a frame that starts a sounding sequence, sounding protocol sequence may not be completed within the TXOP limit. Therefore, since the sounding protocol sequence is an operation that is essential for MIMO and beamforming transmission, an exception to the TXOP limit may be allowed. However, if the exception to the TXOP limit is widely applied in the sounding protocol sequence, the fairness with other wireless communication terminals may be a problem. Therefore, there is a problem in the operation of the wireless communication terminal related to the TXOP limit in the sounding protocol sequence.

Figure 17:
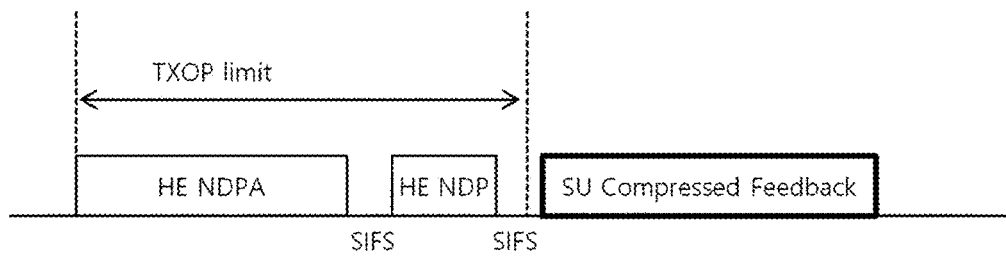
FIGS. 17 to 18 show that the wireless communication terminal according to an embodiment of the present invention performs the sounding protocol operation in relation to the TXOP limit.
Figure 18:
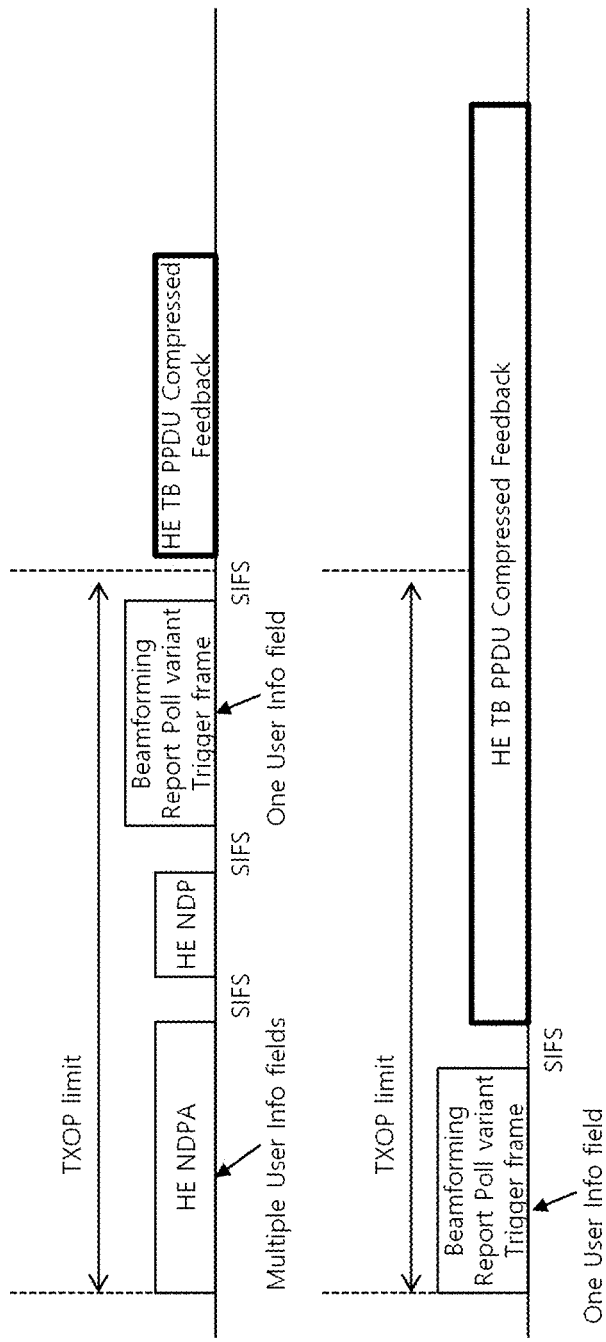

FIGS. 17 to 18 show that the wireless communication terminal according to an embodiment of the present invention performs the sounding protocol operation in relation to the TXOP limit.

The beamformer may transmit NDPA frame and NDP frame using the TXOP exceeding the TXOP limit. Specifically, when an NDP frame is transmitted within a TXOP limit, the beamformer may transmit an NDPA frame and an NDP frame using a TXOP exceeding the TXOP limit. Also, the beamformer may receive the feedback frame in response to the NDP frame from the beamformee within a TXOP exceeding the TXOP limit. The interval between transmission of the NDPA frame and transmission of the NDP frame may be a SIFS. In addition, the time interval between the NDP frame and the feedback frame may be a SIFS. Specifically, the beamformee may transmit the feedback frame after a SIFS from when the NDP frame is received.

Further, when the feedback frame exceeds the maximum A-MPDU length, the beamformee may fragment the feedback frame into a plurality of segments and transmit the segments. In this case, in order to request a subsequent segment for a previously transmitted feedback frame, the beamformer may transmit a Beamforming Report Poll (BRP) frame to the beamformee. In this case, the beamformer may transmit a BRP frame using a TXOP exceeding the TXOP limit. Specifically, when the beamformer transmits a BRP frame within the TXOP limit, the beamformer may transmit the BRP frame using a TXOP exceeding the TXOP limit. Also, the beamformer may receive the feedback frame from the beamformee within a TXOP exceeding the TXOP limit. The time interval between the BRP frame and the feedback frame may be a SIFS. Specifically, the beamformee may transmit the feedback frame after a SIFS from when the BRP frame is received.

In the embodiment of FIG. 17, the beamformer transmits an NDPA frame HE NDPA and an NDP frame HE NDP within the TXOP limit. Since the beamformer transmits the NDPA frame HE NDPA and the NDP frame HE NDP within the TXOP limit, the beamformer may transmit NDPA frame HE NDPA and NDP frame HE NDP using the TXOP exceeding the TXOP limit. Specifically, the beamformer receives the feedback frame SU Compressed Feedback within a TXOP exceeding the TXOP limit. The beamformee transmits the feedback frame after a SIFS from when the NDP frame HE NDP is received.

In addition, the beamformer may transmit a BRP trigger frame to solicit feedback frames from a plurality of beamformers. Specifically, the beamformer may transmit an NDPA frame indicating a plurality of beamformees. In this case, the NDPA frame may include a plurality of user info fields each indicating the plurality of beamformees. Also, the Receiver Address (RA) of the NDPA frame may be a broadcast address. After a predetermined time from when the beamformer transmits the NDPA frame, the beamformer transmits the NDP frame. After transmitting the NDP frame, the BRP trigger frame may be transmitted. In this case, the predetermined time may be a SIFS. The beamformer may receive the BRP trigger frame after a predetermined time from the transmission of the NDP frame. In this case, the predetermined time may be a SIFS. The plurality of beamformers may receive the BRP trigger frame and transmit the feedback frames simultaneously after a predetermined time from when the BRP trigger frame is received. In this case, the predetermined time may be a SIFS. Also, the plurality of beamformees may simultaneously transmit feedback frames using orthogonal frequency multiple access (OFDMA). If the beamformer transmits a BRP trigger frame and the TXOP limit is applied without exception, it may be difficult for the beamformer to trigger the transmission of the feedback frames of a plurality of beamformers. Therefore, the beamformer may have to perform a sounding protocol sequence separately for each beamformee. In relation to these problems, the wireless communication terminal may operate according to the following specific embodiments.

The beamformer may transmit a BRP trigger frame using a TXOP exceeding the TXOP limit. In a specific embodiment, the beamformer may transmit an NDPA frame, an NDP frame, and a BRP trigger frame using a TXOP exceeding the TXOP limit. In this case, when the beamformer transmits an NDPA frame, an NDP frame, and a BRP trigger frame within the TXOP limit, the beamformer may transmit NDPA frames, NDP frames, and BRP trigger frames using a TXOP exceeding the TXOP limit. As described above, the transmission interval between the NDPA frame, the NDP frame, and the BRP trigger frame may be a SIFS. In addition, the time interval between the BRP trigger frame and the feedback frame may be a SIFS. Specifically, the beamformee may transmit the feedback frame after a SIFS from when the BRP trigger frame is received.

When the beamformer uses the BRP trigger frame to trigger the transmission of many beamformee feedback frames, the fairness with existing sounding protocol sequences may be a problem. The wireless communication terminal may operate according to the following specific embodiments considering the fairness with the existing sounding protocol sequence.

In another specific embodiment, although the beamformer uses NDPA frames to indicate a plurality of beamformees, the beamformer may trigger the transmission of feedback frames from a specific number of beamformee in the BRP trigger frame. In this case, the specific number may be 1. Also, the specific number may be set based on the TXOP limit. In addition, the BRP trigger frame may include a predetermined number of User Info fields. Thus, the beamformer receives feedback frames from the predetermined number of beamformees. In the next TXOP of the TXOP that transmitted the first BRP trigger frame, the beamformer may transmit the BRP trigger frame again to trigger transmission of the feedback frames from a specific number of beamformees among the remaining beamformees other than the beamformees previously indicated by the BRP trigger frame among the plurality of beamformees indicated by the NDPA frame. In this case, the BRP trigger frame may include a User Info field indicating each of a specific number of beamformees among the remaining beamformees other than the beamformee previously indicated by the BRP trigger frame among the plurality of beamformees indicated by the NDPA frame. Also, in the next TXOP of the TXOP in which the first BRP trigger frame is transmitted, the beamformer may not transmit the NDPA frame and the NDP frame again. Also, in the next TXOP of the TXOP in which the beamformer transmitted the first BRP trigger frame, when the beamformer transmits the BRP trigger frame within the TXOP limit, the beamformer may transmit the BRP trigger frame using a TXOP exceeding the TXOP limit. Specifically, the beamformee may transmit the feedback frame after a SIFS from when the BRP trigger frame is received.

Also, in the above embodiments, the beamformee may transmit the feedback frame in response to the BRP trigger frame using the trigger-based PPDU.

In the embodiment of FIG. 18, the beamformer transmits an NDPA frame HE NDPA and an NDP frame HE NDP within the TXOP limit. In this case, the NDPA frame HE NDPA indicates a plurality of beamformers. Also, the beamformer transmits a first BRP trigger frame (Beamforming Report Poll trigger variant) after a SIFS from when transmitting the NDP frame HE NDP. In this case, the BRP trigger frame (Beamforming Report Poll trigger variant) indicates one beamformee. The beamformer receives a trigger-based PPDU (HE TP PPDU compressed feedback) including a feedback frame from the beamformee. In this case, the trigger-based PPDU (HE TP PPDU compressed feedback) including a feedback frame may be transmitted to the SIFS from when the beamformee receives the first BRP trigger frame (Beamforming Report Poll trigger variant). In the next TXOP, the beamformer transmits a second BRP trigger frame (Beamforming Report Poll trigger variant). In this case, the second BRP trigger frame (Beamforming Report Poll trigger variant) indicates any of the remaining beamformees other than the beamformee indicated by the first BRP trigger frame (Beamforming Report Poll trigger variant) among the plurality of beamformees indicated by the NDPA frame HE NDPA. Since the beamformer transmits a second BRP trigger frame (Beamforming Report Poll trigger variant) within the TXOP limit, the beamformer transmits the second BRP trigger frame (Beamforming Report Poll trigger variant) using a TXOP exceeding the TXOP limit. Specifically, the beamformer receives a trigger-based PPDU (HE TP PPDU compressed feedback) including a feedback frame within the TXOP exceeding the TXOP limit. In this case, the beamformer receives the trigger-based PPDU (HE TP PPDU compressed feedback) including the feedback frame from the beamformee indicated by the second BRP trigger frame (Beamforming Report Poll trigger variant). In this case, the beamformee may transmit a trigger-based PPDU (HE TP PPDU compressed feedback) including a feedback frame after a SIFS from when the beamformee receives the second BRP trigger frame (Beamforming Report Poll trigger variant).

Figure 19:
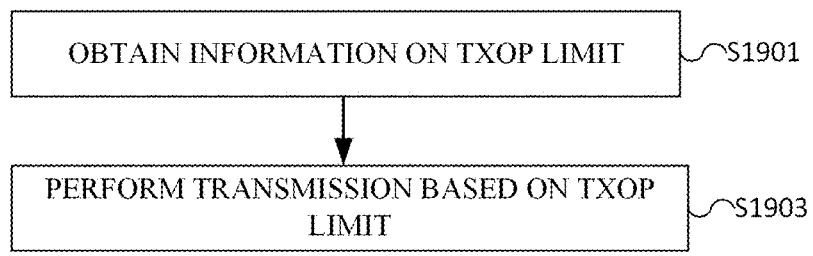
FIG. 19 shows the operation of a wireless communication terminal according to an embodiment of the present invention.

FIG. 19 shows the operation of a wireless communication terminal according to an embodiment of the present invention.

The wireless communication terminal performs transmission based on the TXOP limit. Specifically, the wireless communication terminal may obtain information on the TXOP limit (S1901), and perform transmission based on the information on the TXOP limit (S1903). Specifically, the wireless communication terminal may obtain information on the TXOP limit from the base wireless communication terminal. In this case, the information on the TXOP limit may be the EDCA parameter set element. The wireless communication terminal may perform transmission according to the principle of the TXOP limit described with reference to FIGS. 6 to 7.

The wireless communication terminal may transmit a Beamforming Report Poll (BRP) trigger frame to another wireless communication terminal using a TXOP exceeding the TXOP limit. In this case, the wireless communication terminal may receive the feedback frame in response to the BRP trigger frame from another wireless communication terminal within the TXOP exceeding the TXOP limit. In this case, the BRP trigger frame is capable of triggering simultaneous transmission of feedback frames from one or more wireless communication terminals. The feedback frame may indicate a state of a channel measured by another wireless communication terminal, which is to be used for Multi Input Multi Output (MIMO) transmission of the wireless communication terminal to another wireless communication terminal or beamforming transmission of the wireless communication terminal to another wireless communication terminal. In a specific embodiment, a beamformer preparing for Multi Input Multiple Output (MIMO) transmission or beamforming transmission may transmit an NDPA frame, an NDP frame and a BRP trigger frame using a TXOP exceeding the TXOP limit. For example, after the wireless communication terminal transmits a Null Data Packet Announcement (NDPA) frame informing another wireless communication terminal that the sounding protocol sequence is initiated, the wireless communication terminal may transmit a Null Data Packet (NDP) frame to be used for channel state measurement to another wireless communication terminal. In this case, when the wireless communication terminal transmits the NDPA frame, the NDP frame, and the BRP trigger frame within the TXOP limit, it is possible to transmit the BRP trigger frame to another wireless communication terminal using a TXOP exceeding the TXOP limit after a predetermined time from when the NDP frame is transmitted to another wireless communication terminal.

Also, the BRP trigger frame may be for soliciting a subsequent segment for a feedback frame previously transmitted by another wireless communication terminal. In this case, when the beamformer transmits a BRP trigger frame within the TXOP limit, the beamformer may transmit the BRP trigger frame using the TXOP exceeding the TXOP limit.

The feedback frame may be transmitted from the another wireless communication terminal after a predetermined time elapses from when the another wireless communication terminal receives the BRP trigger frame. The predetermined time described above may all be a SIFS. Specifically, the beamformee and the beamformer may operate according to the embodiments described with reference to FIGS. 17 to 18.

The wireless communication terminal may generate at least one fragment using dynamic fragmentation and transmit at least one fragment to another wireless communication terminal. As described above, dynamic fragmentation may indicate fragments that are not required to equally fragment the size of all fragments except the last fragment.

The wireless communication terminal may determine a fragmentation level to be applied to a fragment to be transmitted to another wireless communication terminal on the basis of a BlockACK agreement with another wireless communication terminal. When there is no BlockACK agreement between the wireless communication terminal and another wireless communication terminal, the wireless communication terminal may perform dynamic fragmentation according to the fragmentation level determined according to the capabilities of the other wireless communication terminals. In this case, the fragmentation level may represent the transmission method of the fragment as described above.

In a specific embodiment, another wireless communication terminal may generate a first fragment that is generated first among the at least one fragment based on a value designated by a minimum size of the fragment. In this case, the wireless communication terminal may transmit the first fragment to another wireless communication terminal using the TXOP exceeding the TXOP limit. When the wireless communication terminal transmits at least one fragment to another wireless communication terminal without using an Aggregate (A)-MPDU including a plurality of MAC Protocol Data Units (MPDUs), it is possible to transmit the first fragment to another wireless communication terminal using the TXOP exceeding the TXOP limit. In this case, the wireless communication terminal may generate the first fragment with the same size as the value designated by the minimum size of the fragments of the another wireless communication terminal.

Further, the wireless communication terminal may generate the at least one fragment by a maximum number that the wireless communication terminal is capable of generating a fragment, and may transmit a second fragment, which is the last generated one among the at least one fragment, to another wireless communication terminal using a TXOP exceeding the TXOP limit. In the specific embodiment, the maximum number that the wireless communication terminal is capable of generating the fragments may be 16.

When another wireless communication terminal explicitly fails to receive a third fragment, which is one of the at least one fragment, the wireless communication terminal may generate a fourth fragment having a different size from the third fragment based on at least one of whether the wireless communication dose not transmit a fragment following the third fragment and whether another wireless communication terminal explicitly fail to receive a fragment following the third fragment. The wireless communication terminal may allocate the sequence number and the fragment number of the third fragment to the fourth fragment. In this case, the wireless communication terminal may transmit the fourth fragment to another wireless communication terminal instead of retransmitting the third fragment to another wireless communication terminal. Specifically, the wireless communication terminal may transmit the fourth fragment using the TXOP exceeding the TXOP limit. When the wireless communication terminal uses the dynamic fragmentation, the wireless communication terminal may operate as in the embodiments described with reference to FIGS. 7 to 16.

The wireless communication terminal may be a TXOP holder. In addition, specific operation when the wireless communication terminal is not a TXOP holder may be the same as that shown in FIGS. 14 to 16.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that wirelessly communicates, the wireless communication terminal comprising:
a transceiver for transmitting and receiving a wireless signal; and
a processor for processing the wireless signal,
wherein the processor is configured to:
perform a transmission based on a transmission opportunity (TXOP) limit which is a maximum value of a TXOP, which is a time interval in which a wireless communication terminal has a right to initiate a frame exchange sequence in a wireless medium,
transmit a Null Data Packet Announcement (NDPA) frame informing that a sounding protocol sequence is initiated,
transmit a Null Data Packet (NDP) frame after a predetermined time from when the NDPA is transmitted,
transmit a Beamforming Report Poll (BRP) trigger frame to one or more other wireless communication terminals after the predetermined time from when the NDP frame is transmitted, wherein the BRP trigger frame triggers simultaneous transmission of feedback frames from the one or more other wireless communication terminals, and
when the wireless communication terminal transmits the NDPA frame, the NDP frame, and the BRP trigger frame within the TXOP limit, receive at least one of the feedback frames from the one or more other wireless communication terminals exceeding the TXOP limit, wherein the at least one of the feedback frames is transmitted after the predetermined time from when the BRP trigger frame is received, wherein the at least one of the feedback frames is transmitted by using trigger-based physical layer protocol data unit (PPDU),
wherein each of the feedback frames indicates a state of a channel measured using the NDP frame by a transmitter of the each of the feedback frames and is to be used for a Multi Input Multi Output (MIMO) transmission to the transmitter of the each of the feedback frames or is to be used for a beamforming transmission to the transmitter of the each of the feedback frames.

2. The wireless communication terminal of claim 1, wherein the predetermined time is a short inter-frame space (SIFS).

3. The wireless communication terminal of claim 1, wherein the wireless communication terminal is a TXOP holder.

4. A method of operating a wireless communication terminal that wirelessly communicates, the method comprising:
- performing a transmission within a transmission opportunity (TXOP) limit which is a maximum value of a TXOP, which is a time interval in which a wireless communication terminal has a right to initiate a frame exchange sequence in a wireless medium,
- transmitting a Null Data Packet Announcement (NDPA) frame informing that a sounding protocol sequence is initiated,
- transmitting a Null Data Packet (NDP) frame after a predetermined time from when the NDPA is transmitted,
- transmitting, to one or more other wireless communication terminals, a Beamforming Report Poll (BRP) trigger frame after the predetermined time from when the NDP frame is transmitted, wherein the BRP trigger frame triggers simultaneous transmission of feedback frames from the one or more other wireless communication terminals, and
- when the wireless communication terminal transmits the NDPA frame, the NDP frame, and the BRP trigger frame within the TXOP limit, receiving the at least one of the feedback frames from the one or more other wireless communication terminals exceeding the TXOP limit, wherein the at least one of the feedback frames is transmitted after the predetermined time from when the BRP trigger frame is received, wherein the at least one of the feedback frames is transmitted by using trigger-based physical layer protocol data unit (PPDU),
- wherein each of the feedback frames indicates a state of a channel measured using the NDP frame by a transmitter of the each of the feedback frames and is to be used for a Multi Input Multi Output (MIMO) transmission to the transmitter of the each of the feedback frames or is to be used for a beamforming transmission to the transmitter of the each of the feedback frames.

5. The method of claim 4, wherein the predetermined time is a short inter-frame space (SIFS).

6. The method of claim 4, wherein the wireless communication terminal is a TXOP holder.

\* \* \* \* \*